(12) United States Patent
Chan et al.

(10) Patent No.: US 10,540,641 B2
(45) Date of Patent: Jan. 21, 2020

(54) SYSTEMS AND METHODS FOR MONITORING CONSTRUCTION PROJECTS

(71) Applicant: The Toronto-Dominion Bank, Toronto (CA)

(72) Inventors: Paul Mon-Wah Chan, Toronto (CA); Jonathan K. Barnett, Toronto (CA); John Jong Suk Lee, Toronto (CA)

(73) Assignee: The Toronto-Dominion Bank, Toronto (CA)

(*) Notice: Subject to any disclaimer, the term of this patent is extended or adjusted under 35 U.S.C. 154(b) by 639 days.

(21) Appl. No.: 15/235,090

(22) Filed: Aug. 11, 2016

(65) Prior Publication Data

US 2017/0046799 A1 Feb. 16, 2017

Related U.S. Application Data

(60) Provisional application No. 62/204,768, filed on Aug. 13, 2015.

(51) Int. Cl.
*G06Q 20/06* (2012.01)
*G06F 21/64* (2013.01)
(Continued)

(52) U.S. Cl.
CPC ......... *G06Q 20/0655* (2013.01); *G06F 21/62* (2013.01); *G06F 21/645* (2013.01); *G06Q 10/0631* (2013.01); *G06Q 10/063114* (2013.01); *G06Q 10/08* (2013.01); *G06Q 10/103* (2013.01); *G06Q 10/1097* (2013.01); *G06Q 20/065* (2013.01); *G06Q 20/102* (2013.01); *G06Q 20/367* (2013.01); *G06Q 20/3829* (2013.01); *G06Q 20/401* (2013.01); *G06Q 20/405* (2013.01); *G06Q 20/4016* (2013.01); *G06Q 30/0214* (2013.01); *G06Q 40/08* (2013.01); *G06Q 40/128* (2013.12); *G06Q 50/08* (2013.01);
(Continued)

(58) Field of Classification Search
None
See application file for complete search history.

(56) References Cited

U.S. PATENT DOCUMENTS 5,924,094 A * 7/1999 Sutter ................ G06F 21/6227
6,473,794 B1 * 10/2002 Guheen .................. H04L 41/22
709/223

(Continued)

*Primary Examiner* — Thomas L Mansfield
(74) *Attorney, Agent, or Firm* — Duane Morris LLP

(57) ABSTRACT

A system includes devices and sensors associated with a construction site for a project. A computing apparatus, communicates with the devices and the sensors, includes a storage device and a processor. The storage device stores software instructions for controlling the processor that when executed by the processor configures the processor to obtain a predetermined construction schedule with terms for the project. The processor obtains sets of data that each corresponds to a different term. The processor generates a distributed listing for the project, which includes a sequence of a plurality of units corresponding to different terms and sets of data. The processor receives a signal from one of the sensors, wherein the signal is representative of a progress event. The processor identifies whether the progress event at the site corresponds to one of the terms in the schedule and updates and saves the distributed listing when a correspondence is identified.

22 Claims, 6 Drawing Sheets

(51) Int. Cl.
  H04N 5/913    (2006.01)
  G06Q 20/36    (2012.01)
  G06Q 10/06    (2012.01)
  G06Q 10/10    (2012.01)
  G06Q 50/08    (2012.01)
  G06Q 20/10    (2012.01)
  G06Q 20/40    (2012.01)
  G06F 21/62    (2013.01)
  H04L 9/08     (2006.01)
  G06Q 50/18    (2012.01)
  H04L 9/32     (2006.01)
  H04L 29/06    (2006.01)
  G06Q 10/08    (2012.01)
  G06Q 30/02    (2012.01)
  G06Q 40/00    (2012.01)
  G06Q 40/08    (2012.01)
  G06Q 20/38    (2012.01)

(52) U.S. Cl.
  CPC ......... *G06Q 50/18* (2013.01); *H04L 9/0816* (2013.01); *H04L 9/0861* (2013.01); *H04L 9/0891* (2013.01); *H04L 9/0894* (2013.01); *H04L 9/3247* (2013.01); *H04L 63/061* (2013.01); *H04L 63/062* (2013.01); *H04L 63/0876* (2013.01); *H04N 5/913* (2013.01); *G06Q 2220/00* (2013.01); *G06Q 2220/10* (2013.01); *G06Q 2230/00* (2013.01); *H04L 63/0435* (2013.01); *H04L 63/0442* (2013.01); *H04L 63/08* (2013.01); *H04L 63/12* (2013.01); *H04L 2209/24* (2013.01); *H04L 2209/38* (2013.01); *H04L 2209/56* (2013.01); *H04N 2005/91342* (2013.01); *Y02P 90/86* (2015.11); *Y04S 10/54* (2013.01)

(56) References Cited

U.S. PATENT DOCUMENTS

| | | | |
|---|---|---|---|
| 7,167,844 B1* | 1/2007 | Leong | G06Q 30/04 |
| | | | 705/37 |
| 2001/0027407 A1* | 10/2001 | Mori | G06Q 10/06 |
| | | | 705/7.12 |
| 2014/0277666 A1* | 9/2014 | Morkos | G06Q 10/06 |
| | | | 700/100 |
| 2014/0279694 A1* | 9/2014 | Gauger | G06Q 40/06 |
| | | | 705/36 R |
| 2014/0297468 A1* | 10/2014 | Patterson | G06Q 30/0633 |
| | | | 705/26.35 |
| 2015/0227890 A1* | 8/2015 | Bednarek | G06Q 10/08355 |
| | | | 705/26.81 |
| 2016/0189089 A1* | 6/2016 | Iyer | G06Q 50/08 |
| | | | 705/28 |

* cited by examiner

SYSTEMS AND METHODS FOR MONITORING CONSTRUCTION PROJECTS

CROSS-REFERENCE TO RELATED APPLICATION

This application claims priority under 35 U.S.C. § 119(e) from U.S. Provisional Application Ser. No. 62/204,768 filed Aug. 13, 2015, the entirety which is hereby incorporated by reference herein.

BACKGROUND

At least some known construction projects, such as the construction of a new building or a renovation of a building, may require funding that can be financed or secured from a lender, such as a bank, in the form of a line of credit ("LoC"). Such funds can have a corresponding predetermined schedule for the construction project, wherein the schedule includes various agreed upon terms, such as, for example, deadlines for completing various phases of the project and the release of a set number funds upon completion of each phase. Construction delays due to, for example, bad weather or injuries, and/or subpar building processes may delay the schedule and/or create a misrepresented completion of work. One approach used to mitigate such issues is to have inspectors be sent to the construction site on a regular basis to determine the progress of the construction project and to authorize the release the next batch of funds. However, this approach can be time-consuming by having a person physically visit a site on various occasions and can take-up various resources.

At least some known virtual and crypto-currencies, such as Bitcoin™, are gaining acceptance as viable mechanisms for performing purchase transactions and other financial services transactions, such as the currency used for funding construction projections. The transfer of units of these virtual and crypto-currencies between parties, which is essential to the ultimate success of these virtual and crypto-currencies, relies on a robust block-chain ledger structure that, due to its public nature, redundant verification, and resistance to fraudulent activity, offers advantages over existing centralized server systems. Despite its many advantages, however, such known block-chain-based ledger systems have several drawbacks, especially when used to monitor loan transactions for construction projects due to the secure, high-risk and/or sensitive contexts.

SUMMARY

The embodiments described herein enable the financing of a construction project such that risks associated with mismanaged construction delays are mitigated and the number of physical inspectors that are needed is substantially reduced. The embodiments described herein uses hybrid block-chain ledgers to efficiently build a payment system that tracks the state of the construction project and compares it to the predetermined construction and financing schedule.

For example, in some embodiments, a system for use in monitoring at least one construction project is provided. The system includes a plurality of devices associated with a construction site for the construction project and a plurality of sensors that are each configured to couple to one of the devices. A computing apparatus communicates with the sensors, wherein the computing apparatus includes a storage device and a processor coupled to the storage device. The storage device stores software instructions for controlling the processor that when executed by the processor configures the processor to obtain a predetermined construction schedule for the construction project, wherein the predetermined construction schedule includes a plurality of terms. The processor is also configured to obtain a plurality of sets of data that each corresponds to a different term. The processor is configured to generate a distributed listing or ledger for the construction project, wherein the distributed listing includes a block-chain or a sequence of a plurality of units such that each block or unit corresponds to a different term and a different set of data. Moreover, the processor is configured to receive at least one signal from one of the sensors, wherein the signal is representative of a progress event of a plurality of progress events at the construction site. The processor is configured to identify whether the progress event at the construction site corresponds to one of the terms in the predetermined construction schedule. The processor is further configured to update and save the distributed listing when the progress event is identified as corresponding to one of the terms in the predetermined construction schedule by updating the sequence of the plurality of units with a new transaction that is based on the corresponding term.

In other embodiments, a method for monitoring at least one construction project is provided. The method includes coupling a plurality of sensors to one of a plurality of devices that are associated with a construction site for the construction project. A predetermined construction schedule for the construction project is obtained, wherein the predetermined construction schedule includes a plurality of terms. A plurality of sets of data that each corresponds to a different term is obtained. A distributed ledger or listing is generated for the construction project using a computer processor, wherein the distributed listing includes a block-chain or a sequence of a plurality of units such that each block or unit corresponds to a different term and a different set of data. At least one signal is received from one of the sensors, wherein the signal is representative of a progress event of a plurality of progress events at the construction site. The method also includes identifying whether the progress event at the construction site corresponds to one of the terms in the predetermined construction schedule. The distributed listing is updated and saved when the progress event is identified as corresponding to one of the terms in the predetermined construction schedule by updating the sequence of the plurality of units with a new transaction that is based on the corresponding term.

In some embodiments, at least one non-transitory computer-readable storage medium having computer-executable instructions embodied thereon is provided, wherein, when executed by at least one processor, the computer-executable instructions cause the processor to communicate with a plurality of sensors and a plurality of devices that are associated with a construction site for a construction project and to obtain a predetermined construction schedule for at least one construction project, wherein the predetermined construction schedule includes a plurality of terms. The computer-executable instructions also cause the processor to obtain a plurality of sets of data that each corresponds to a different term. The computer-executable instructions also cause the processor to generate a distributed listing or ledger for the construction project, wherein the distributed listing includes a block-chain or a sequence of a plurality of units such that each block or unit corresponds to a different term and a different set of data. The computer-executable instructions further cause the processor to receive at least one signal from one of the sensors, wherein the signal is representative of a progress event of a plurality of progress events at the construction site, and to identify whether the progress event at the construction site corresponds to one of the terms in the predetermined construction schedule. The computer-executable instructions also cause the processor to update and save the distributed listing when the progress event is identified as corresponding to one of the terms in the predetermined construction schedule by updating the sequence of the plurality of units with a new transaction that is based on the corresponding term.

BRIEF DESCRIPTION OF THE DRAWINGS

The following will be apparent from elements of the figures, which are provided for illustrative purposes and are not necessarily to scale.

DETAILED DESCRIPTION

This description of the exemplary embodiments is intended to be read in connection with the accompanying drawings, which are to be considered part of the entire written description. The use of the singular includes the plural unless specifically stated otherwise. The use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
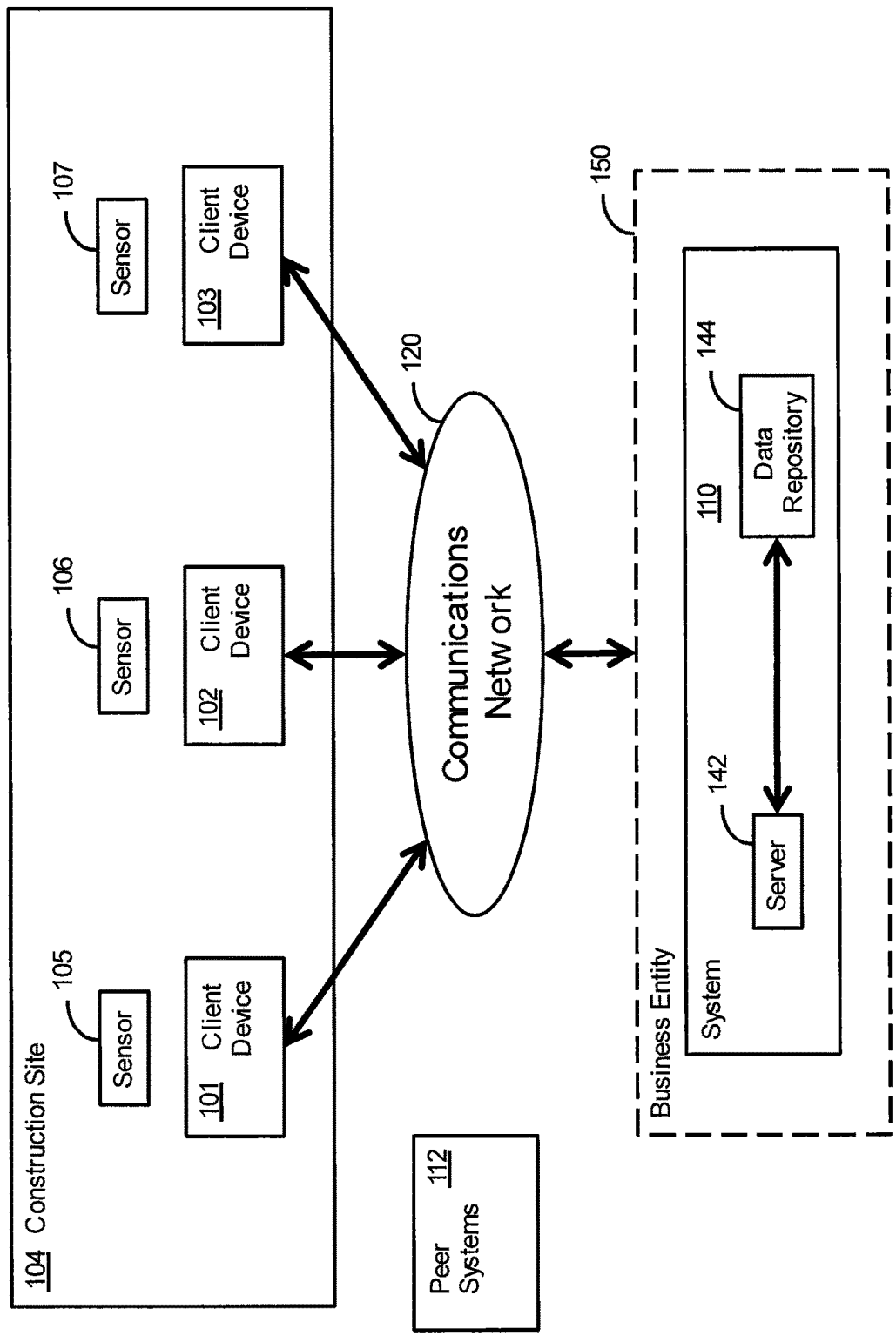
FIG. 1 is a diagram of a system in accordance with some embodiments of the present disclosure.

FIG. 1 is a block diagram of a system 100 in accordance with some embodiments of the present disclosure, wherein system 100 is configured to enable the monitoring of at least one construction project that is being financed. System 100 may be a computing environment including internet of things (IoT) or client devices 101, 102, and 103, that are located on, for example, a construction site 104 of the construction project. Although three client devices are shown in this example, any number of client devices may be present. In some embodiments, each client device 101, 102, and 103 is enabled to receive data and is enabled to process the data. Each client device 101, 102, and 103 is further enabled to transmit the data to another location. For example, in some embodiments, construction site 104 includes a plurality of sensors, such as sensors 105, 106, and 107 (only three being shown in FIG. 1), that are positioned proximate to and/or coupled to client devices 101, 102, and 103, respectively. As such, client devices 101, 102, and 103 may receive data from respective sensors 105, 106, and 107 and/or from a user (not shown). In some embodiments, other suitable construction equipment that are connected can be used such that the connected equipment can communicate it's usage logs, and there can be manual entry by a party in the transaction. System 100 can also include, in some embodiments, a system 110, peer systems 112, and a communications network 120 connecting various components of system 100. It should be noted that, as used herein, the term "couple" is not limited to a direct mechanical, fluid, thermal, communication, and/or an electrical connection between components, but may also include an indirect mechanical, fluid, thermal, communication and/or electrical connection between multiple components.

Various components of system 100 are configured to address problems associated with conventional block-chain-based ledgers by embedding a master encryption key architecture into a conventional block-chain architecture (e.g., a block-chain-based architecture associated with the public Bitcoin™ ledger). In various embodiments, as explained in more detail below with respect to FIG. 4, the resulting hybrid public-private block-chain architecture facilitates the communication of information at construction site 104 between client devices 101, 102, and 103, system 110, and/or peer systems 112, such that the construction project can be monitored to mitigate the risks associated with mismanaged construction delays and to reduce the number of physical inspectors needed to manage to financing of a construction project.

The conventional block-chain architecture is described below with reference to FIG. 2, along with hybrid public-private block-chain architectures in accordance with various embodiments are described.

Asset Tracking Using Conventional Block-Chain Ledgers

Figure 2:
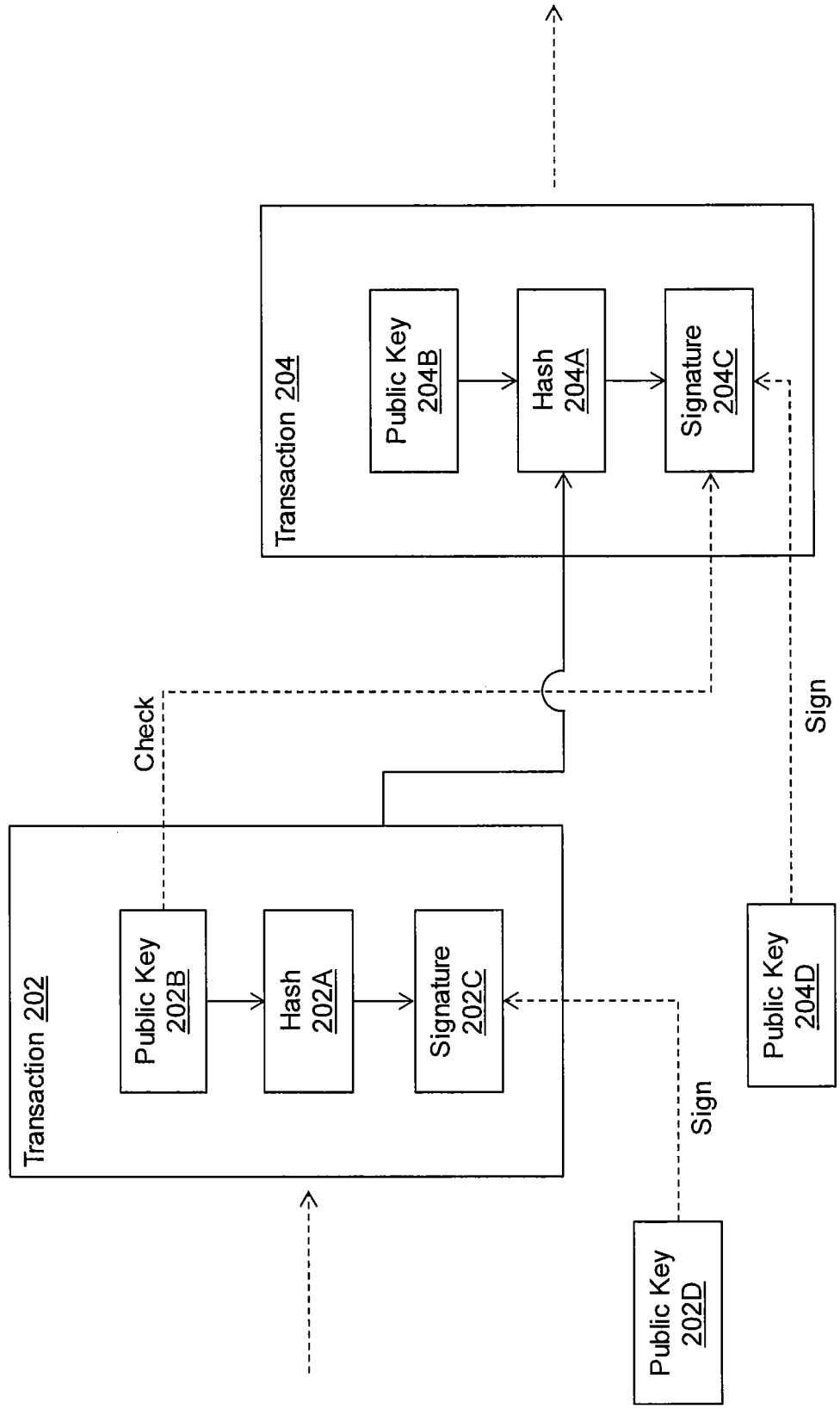
FIG. 2 is a diagram of a conventional block-chain ledger architecture.

FIG. 2 is a diagram of a structure 200 of a conventional block-chain ledger, which may be generated through the interaction of the components of system 100. In the example of FIG. 2, a user (not shown), such as a construction inspector, can be associated with, for example, client device 101 (shown in FIG. 1), which executes a stored software application (e.g., a wallet application) capable of obtaining a current version of a conventional block-chain ledger from one or more networked computer systems (e.g., one of peer systems 112 (shown in FIG. 1) configured to "mine" broadcasted transaction data and update ledgers). The current version of a conventional block-chain ledger or listing may represent a "longest" block-chain ledger than includes a maximum number of discrete "blocks" or "units". In some embodiments, the blocks identify respective transactions, wherein each transaction can correspond to, for example, a different agreed upon term that is included in a predetermined construction schedule or contract for the construction project between the lender and the person or entity receiving financing for the construction project.

FIG. 2 shows blocks corresponding to two transactions 202 and 204, with arrows to the left and right of these transactions indicating that these are merely two transactions in a potentially longer series of chained blocks (hence the term "block-chain ledger"). In the first transaction (transaction 202) depicted in FIG. 2, a user, such as a construction inspector at construction site 104 (shown in FIG. 1), communicates or enters one term of the predetermined construction schedule that has been completed to, for example, client device 101. In the second transaction (transaction 204), a user enters a different term of the predetermined construction schedule that has been completed to, for example, client device 102 (shown in FIG. 1). In general, any number of transactions may be supported.

Client device 101 can obtain the current block-chain ledger and process or transmit the information to another device to determine, at a later time, whether the term has been fulfilled. One or more peer systems 112, previously verified, can process, and pack the data associated with transaction 202 into a corresponding block of the conventional block-chain.

Transaction 202 includes a cryptographic hash (e.g., hash 202A) of one of the terms in the predetermined construction schedule and a public key of the recipient (e.g., public key 202B of a user). The transaction data may also include a digital signature 202C of the user, which is applied to hash 202A and public key 202B using a private key 202D of a user through any of a number of techniques apparent to one of skill in the art. The presence of a user's public key within transaction data included within the conventional block-chain ledger facilitates verification of the user's digital signature 202C by client device 101 and/or peer systems 112, for example.

In the second transaction (transaction 204), a user inputs the next term of the predetermined construction schedule that has been completed into client device 102. For example, client device 102 may execute one or more software applications (e.g., wallet applications) that generate data specifying a transaction (e.g., transaction 204), such as the completion of the next term at construction site 104. The software application(s) transmit the generated data to one or more of peer systems 112 for verification, processing (e.g., additional cryptographic hashing) and inclusion into a new block of the block-chain ledger.

For example, second transaction 204 may include a cryptographic hash 204A of prior transaction 202, the term that was at issue in transaction 204, and a public key 204B of, for example, a different user, such a different inspector at construction site 104. Further, in some aspects, transaction 204 may include a digital signature 204C of the user, which may be applied to hash 204A and public key 204B using a private key 204D of the user. Further, and by way of example, the presence of a user's public key 202B within the transaction data included within the conventional block-chain ledger may enable various devices and systems (e.g., client devices 101, 102, and/or 103, peer systems 112, etc.) to verify a user's digital signature 204C, as applied to data specifying transaction 204.

One or more of peer systems 112 may receive the data specifying transaction 204 from client device 101. In certain instances, peer systems 112 may act as "miners" for the block-chain ledger, and may competitively process the received transaction data (either alone or in conjunction with other data) to generate additional blocks of the ledger, which may be appended to the block-chain ledger and distributed across peer systems 112 (e.g., through a peer-to-peer network) and to other connected devices of system 100.

Conventional block-chain ledger architectures can enable, for example, a lender to review the contents of the ledgers and verify whether terms of the predetermined construction schedule have been fulfilled such that funds may be released for the construction project during the various phases of the construction project. The decentralized nature of conventional block-chain ledgers enables multiple distributed networks to verify the contents of a single ledger. The resulting redundancy may render conventional block-chain ledger architecture more robust than centralized server systems, and effectively enables the monitoring of construction projects that are being financed.

Despite these positive characteristics, conventional block-chain ledger architectures have certain drawbacks when implemented by secured, high-risk systems. For example, unencrypted conventional ledger blocks may represent a security concern for transactions of sensitive nature and may represent a privacy concern for the people or entities obtaining the loans. For instance, information indicative of financial information or phases of a construction project and a corresponding device, as present within conventional block-chain ledgers, may represent private information that should not be available to members of the public.

Furthermore, if an inspector, for example, loses his/her private key, the distributed nature of conventional block-chain ledger architectures provides little or no opportunity to recover possession of or update the tracked term(s) of a construction project. The rigidity and inflexibility of these conventional block-chain ledger architectures, and their inability to adapt to changing circumstances (e.g., loss of private keys, theft of financial information due to fraudulent or malicious activity), often results in volatility in the usage of system 100 and can result in the mismanagement of construction delays.

Various embodiments described herein address the foregoing deficiencies of conventional block-chain ledger architectures by providing features suitable for use in high-risk, sensitive scenarios. Furthermore, various embodiments described herein provide a framework that mitigate the risks that may be associated with mismanaged construction delays and reduces the number of physical inspectors that are needed.

Client Devices and Sensors

Referring back to FIG. 1, in some embodiments, each of client devices 101, 102, and 103 may include a computing device, such as a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device. At least one of client devices 101, 102, and 103 may be associated with one or more users, such as inspectors at construction site 104. For example, the user can operate client device 101 and cause it to perform one or more operations in accordance with various embodiments.

Each client device 101, 102, 103 includes one or more tangible, non-transitory memories that store data and/or software instructions, and one or more processors configured to execute software instructions. Client devices 101, 102, and 103 may include one or more display devices that display information to a user and one or more input devices (e.g., keypad, keyboard, touchscreen, voice activated control technologies, or any other type of known input device) to allow the user to input information to the client device.

In one aspect, each client device 101, 102 and 103 stores in memory one or more software applications that run on the client device and are executed by the one or more processors. In some instances, each client device stores software applications that, when executed by one or more processors, perform operations that establish communications with one or more of peer systems 112 (e.g., across network 120) and that obtain, from peer systems 112, a current version of a hybrid block-chain ledger generated and maintained in accordance with various embodiments.

Each client device 101, 102, and 103 may execute the stored software application(s) to obtain and transmit data to the hybrid block-chain ledger that includes terms of a predetermined construction schedule or contract for a construction project. The executed software applications may cause client devices 101, 102, and 103 to extract, from one or more accessed transaction blocks of the block-chain ledger, a copy of an encrypted and/or hashed ownership/rules portion of the transaction block(s) (e.g., including the identification of a holder of a master key) and/or a copy of an encrypted and/or hashed master data block (e.g., encrypted using the master key and including rules permitting preconfigured and/or permissible actions involving the tracked assets). Client devices 101, 102, and 103 may also provide information associated with one or more actions or transactions involving the terms being completed to peer systems 112, along with copies of the encrypted and/or hashed rules engines and lists of triggering events.

In some embodiments, the stored application(s) include a wallet application provided by, for example, a business entity 150 (e.g., a mobile wallet application or an application executable on a desktop computer). The wallet application is capable of initiating transactions denominated in one or more currencies, including virtual currencies such as Bitcoin™.

In some embodiments, in addition to obtaining information from users, client devices 101, 102, and 103, can obtain information from sensors 105, 106, and 107, respectively. Sensors 105, 106, and 107 can be configured to detect at least one mode or term of the construction project that is being developed or being completed on construction site 104. For example, in some embodiments, sensor 105 can detect when one predefined phase or predefined term in a predetermined construction schedule for the construction project has been completed and sensors 106 and 107 can each detect when another predefined phase or another predefined term has been completed. In some embodiments, sensors 105, 106, and 107 can detect other modes or terms that occur, but that may not necessarily be predefined or associated with the construction project. For example, a new term may need to be performed on construction site 104 due to bad weather. This new term can also be detected by one of sensors 105, 106, and 107.

In some embodiments, sensors 105, and 106, and 107 is connected to client devices 101, 102, and 103, respectively, via various connections. Such connections may include, without limitation, an electrical conductor, a low-level serial data connection, such as Recommended Standard (RS) 232 or RS-485, a high-level serial data connection, such as USB, a field bus, a PROFIBUS®, or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside system 100) network connection, whether wired or wireless. IEEE is a registered trademark of the Institute of Electrical and Electronics Engineers, Inc., of New York, N.Y. BLUETOOTH is a registered trademark of Bluetooth SIG, Inc. of Kirkland, Wash. PROFIBUS is a registered trademark of Profibus Trade Organization of Scottsdale, Ariz.

In some embodiments, after sensors 105, 106, and/or 107 detect, for example, when a predefined phase or a predefined term in a predetermined construction schedule for the construction project has been completed, sensors 105, 106, and/or 107 can transmit a signal representative of the detected information to respective client devices 101, 102, and/or 103. Sensors 105, 106, and 107 may each transmit a signal continuously, periodically, or only once, for example, to respective client devices 101, 102, and 103. Other embodiments use different signal timings. Furthermore, sensors 105, 106, and 107 may each transmit a signal either in an analog form or in a digital form.

Exemplary Computer Systems

As shown in FIG. 1, system 110 may be a computing system configured to execute software instructions to perform one or more operations in accordance with various embodiments. In one aspect, system 110 can be associated with business entity 150 (e.g., a financial institution) that provides financial accounts, financial services transactions, loans, and investment services to one or more users (e.g., customers of business entity 150). In some aspects, system 110 is a distributed system that includes computing components distributed across one or more networks, e.g., network 120.

In one aspect, system 110 includes computing components configured to store, maintain, and generate data and software instructions. For example, system 110 may include one or more servers (e.g., server 142) and tangible, non-transitory memory devices (e.g., data repository 144). Server 142 may include one or more computing devices configured to execute software instructions to perform one or more processes in accordance with various embodiments. In one example, server 142 is a computing device that executes software instructions to perform operations that provide information to at least one other component of system 100.

In one embodiment, server 142 includes a computer (e.g., a personal computer, network computer, or mainframe computer) having one or more processors that are selectively activated or reconfigured by a computer program. In one aspect, server 142 (or other computing components of system 140) may be configured to provide one or more websites, digital portals, etc., that provide services consistent with business entity 150, such as a digital banking or investment portal. For instance, server 142 may be configured to provide information associated with a requested web page over communications network 120 to client device 101, which may render the received information and present content from the web page on a display device, e.g., a touchscreen display unit.

In other aspects, server 142 (or other computing components of system 110) may be configured to provide information to one or more application programs executed by client device 101, e.g., through a corresponding application programming interface (API). For example, client device 101 may execute an application program associated with and provided by business entity 150, such a mobile banking application and/or a mobile wallet application, to provide services in accordance with various embodiments. In some instances, server 142 provides information to client devices 101, 102, and/or 103 (e.g., through the API associated with the executed application program), and client devices 102, 104, and/or 106 present portions of the information to corresponding users through a corresponding graphical user interface (GUI).

Server 142 (or other computing components of system 110) may be configured to provide to client devices 101, 102, and/or 103 (and/or receive from any of the client devices) information associated with services provided by business entity 150. For example, client device 102 may receive the transmitted information, and store portions of the information in locally accessible storage device and/or network-accessible storage devices and data repositories (e.g., cloud-based storage). In one instance, client device 101 executes stored instructions (e.g., an application program, a web browser, a mobile banking application, and/or a mobile wallet application) to process portions of the stored data and render portions of the stored data for presentation to a user. Additionally, server 142 may be incorporated as a corresponding node in a distributed network or as a corresponding networked server in a cloud-computing environment. Furthermore, server 142 may communicate via network 120 with one or more additional servers (not shown), which may facilitate the distribution of processes for parallel execution by the additional servers.

In further aspects, business entity 150 may represent a "controlling entity" capable of regulating construction projects, such as monitoring when terms of a predetermined schedule for the construction project have been met, by tracking within hybrid public-private ledgers in accordance with various embodiments. For example, one or more computing components of system 110 (e.g., server 142) may be configured (e.g., by executed software instructions) to establish one or more rules that regulate a distributions of funds and/or transactions associated with the terms, and any other action involving the construction project at construction site 104 and/or the hybrid public-private ledger (e.g., processes that generate additional cryptographic key sets for a user, processes that recover terms that are being tracked in the hybrid public-private ledger, etc.).

System 110 may establish causal relationships between one or more of the established rules and one or more events that trigger an initiation of one or more corresponding regulated distributions of funds, transfers, and/or other actions involving terms of the construction project being tracked within the hybrid public-private ledger (e.g., "triggering events"). For example, as explained in more detail with respect to FIG. 4, an aspect of a project being completed at construction site 104 may represent a triggering event that causes system 110 to verify whether the aspect of the project that was just completed was, in fact, an agreed upon term in a pre-determined construction schedule and to update the distributed ledger, in accordance with one or more of the established rules.

A completion of a term in a predetermined construction schedule may represent a triggering event. This triggering event can causes system 110 to initiate a distribution protocol to generate a transaction request verify the completion of the term and to, for example, generate a new pair of public and private block-chain keys for a user, such that funds can be distributed based on the completion of the agreed upon term. In other instances, a completion of a new term that was not previously agreed upon may represent a triggering event that causes system 110 to initiate a series of transaction to update the terms. Various embodiments are, however, not limited to the exemplary triggering events and established rules described above, and in other aspects, various embodiments may be configured to generate any other user- and system-specified rules and triggering events consistent with the hybrid public-private ledger and appropriate to the construction project at construction site 104, the users, and/or business entity 150 (acting as a centralized authority for the hybrid public-private ledger).

System 110 may be configured to store the one or more established rules (e.g., as a rules engine) and one or more of the established trigger events (e.g., as an event trigger list) within a portion of a local data repository (e.g., data repository 144). System 140 may be configured to store portions of the rules engine and/or event trigger list within a secure data repository accessible to system 110 across network 120 (e.g., cloud-based storage).

One or more computing components of system 110 (e.g., server 142) may be configured to generate pairs of public and private block-chain keys after terms of the predetermined construction schedule have been completed and to provide the generated private block-chain key to users through secure, non-accessible and/or out-of-band communications (e.g., by mail, etc.) such that the users can obtain the funds needed upon completion of the terms. In further embodiments, the one or more components of system 110 (e.g., server 142) may be configured to generate and maintain additional cryptographic keys that facilitate a generation and maintenance of portions of the hybrid public-private ledger. For instance, system 110 may be configured to generate a master key, which system 110 may leverage to encrypt the stored rules engine. System 110 may store copies of the generated master key in a portion of data repository 144 that is not accessible to users, thus maintaining a confidence of the generated master key.

System 110 may be configured to generate and maintain a private crypto key on behalf of users, which system 110 may leverage to encrypt the stored event trigger list, and which may be provided to users through secure, non-accessible and/or out-of-band communications. System 110 may store copies of the private crypto keys in a portion of data repository 144.

In some embodiments, one or more computing components of system 110 (e.g., server 140) is configured to hash the generated (and encrypted) rules engine and event trigger list into a genesis block associated with the hybrid public-private ledger. System 110 may provide the encrypted rules engine and event triggers list to one or more of peer systems 112, which may be configured to hash the encrypted rules engine and event trigger list into the genesis block. By hashing the encrypted rules engine and event trigger list into the genesis block of the hybrid public-private ledger, various embodiments enable an in-band communication of the encrypted rules engine and event triggers based on completed terms at construction site 104 within blocks (e.g., transactions) of the hybrid public-private ledger.

Exemplary Data Repositories and Stored Data

Referring to FIG. 1, data repository 144 may include one or more memories that are configured to store and provide access to data and/or software instructions. Such memories may include tangible non-transitory computer-readable media that store software instructions that, when executed by one or more processors (e.g., of server 142), perform one or more operations in accordance with various embodiments. Data repository 144 may also be configured to store information relating to business entity 150, e.g., a financial institution.

For instance, data repository 144 may store a predetermined construction schedule for a construction project that is being financed by business entity. As such, data repository also stores each of the agreed upon terms that are included in the schedule. For example, in some embodiments, a developer or owner of a construction project (i.e., a user may access a web page associated with system 140 (e.g., through a web server executed by a corresponding front end), and may apply for a loan for the construction project. When the loan is finalized, a predetermined construction schedule can be generated that includes various terms for various phases of the project that correspond to a release of funds at various phases. For example, business institution 150 can require that funds to finance the project be distributed incrementally at various stages during the construction project, wherein certain terms must be completed at each stage in order for the funds to be released to the owner.

Data repository 144 may also obtain sets of data that each corresponds to a different term in the schedule, wherein each set of data includes a different device (e.g., client devices 101, 102, and 103) and a different sensor (e.g., sensors 105, 106, and 107) associated with the corresponding term. For example, each term that is included in the predetermined construction schedule may have a corresponding sensor that detects when the term is completed and a corresponding client device that communicates the completion to system 110 such that funds can be released accordingly. Data repository may also store data for each customer of business entity 150, such as a developer or owner of a construction project. The stored customer data may, for example, include personal information, government-issued identifiers, employment information, and contact information. The stored customer data may also include authentication credentials associated with registered users of the financial institution, e.g., a user name, a user-specified password, a system-generated password, an alphanumeric identification number (e.g., a PIN number) specified by the users or assigned by system 110, biometric information, and information facilitating enhanced authentication techniques.

Data repository 144 may store a rules engine identifying one or more rules that monitor the construction project, an initiation of one or more transactions involving the tracked terms (e.g., when a term has been completed), and any other action involving the construction project and/or the hybrid public-private ledger (e.g., processes that generate additional cryptographic key sets for the construction project, processes that identify completed terms that are tracked in the hybrid public-private ledger, etc.). Data repository 144 may also store information identifying an event triggers list that identifies causal relationships established by system 110 between one or more of the established rules and one or more events that trigger an initiation of one or more corresponding regulated distributions, transactions, and/or terms tracked within the hybrid block-chain ledger (e.g., "triggering events").

In some aspects, system 110 is configured to establish one or more of the rules, and one or more of the causal relationships and triggering events, based on one or more internal regulations associated with business entity 150. In other aspects, system 110 may establish one or more of the rules and/or triggering events based on information received from customers, as input provided to a web page or other graphical user interface (GUI), or based on information received from client devices 101, 102, and 103 based on what the respective sensors 105, 106, and 107 detect.

Data repository 144 may also store a copy of a master key, private crypto keys associated with customers and/or client devices 101, 102, and/or 103 and additional private crypto keys associated with other users. For example, system 110 may be configured to store the private crypto keys in a data structure that includes information that associates the private crypto keys with corresponding customers, and further, may be configured to store the master key in a data structure within data repository 144 that is inaccessible to customers (and other users). Further, in some aspects, data repository 144 may be configured to store the rules engine and/or event triggers list in raw, unencrypted form. In other aspects, in accordance with various embodiments, data repository 144 may be configured to store the rules engine and/or event triggers in encrypted form (e.g., using the stored master key), and/or store a hashed representation of the rules engine and/or the event triggers list.

Exemplary Communications Networks

Communications network 120 may include one or more communication networks or media of digital data communication. Examples of communication network 120 include a local area network (LAN), a wireless LAN, a RF network, a Near Field Communication (NFC) network, (e.g., a WiFi network), a wireless Metropolitan Area Network (MAN) connecting multiple wireless LANs, NFC communication link(s), and a wide area network (WAN), e.g., the Internet. In accordance with various embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols in accordance with various embodiments also include protocols facilitating data transfer using radio frequency identification (RFID) communications and/or NFC. Moreover, communications network 120 may also include one or more mobile device networks, such as a GSM network or a PCS network, allowing client devices 101, 102, and 103 to send and receive data via applicable communications protocols, including those described herein.

Exemplary Peer Systems

Referring back to FIG. 1, peer systems 112 may include one or more computing systems configured to execute software instructions to perform one or more operations in accordance with various embodiments. In some aspects, peer systems 112 may include computing components configured to store, maintain, and generate data and software instructions. For example, each of peer systems 112 may include one or more computing devices (e.g., a server, network computer, or mainframe computer) having one or more processors that may be selectively activated or reconfigured by executable instructions (e.g., computer programs) stored in one or more tangible, non-transitory computer-readable storage devices.

In an embodiment, one or more of peer systems 112 may be configured to receive, from client devices 101, 102, and 103, across network 120, information associated with transaction involving, or other action associated with one or more terms being tracked within hybrid block-chain ledgers in accordance with various embodiments. For example, the received information may include, but is not limited to, data identifying at least a portion of the tracked terms, data identifying the developer or owner of the construction project, and further, encrypted copies of and/or hash values representative of the rules engine and event triggers list.

In some aspects, one or more of peer systems 112 are configured (e.g., by the executed software programs) to validate the received information and to generate a new block of the hybrid block-chain ledger that includes the received information, either alone (e.g., using a "one transaction, one block" paradigm) or in combination with information identifying additional transactions related to or other actions associated with one or more tracked terms (e.g., as a multiple-transaction block). One or more peer systems 112 may be further configured to generate one or more hashes representative of the new block, which may be appended to a prior version of the hybrid private-public ledger along with the newly generated block. In some aspects, one or more peer systems 112 may maintain the updated versions of the hybrid private-public ledger (i.e., the latest, longest hybrid private-public ledger), and may provide the updated version of the hybrid private-public ledger to business entity 150 upon receipt of a request across network 120 and/or at regular or predetermined intervals.

In certain instances, and in addition to a connection with network 120, peer systems 112 may be interconnected across a peer-to-peer network (not shown in FIG. 1) using any of the wired or wireless communications protocols outlined above. Further, in some instances, one or more of peer systems 112 may function as a "miner," where any miner may be compensated in units of a virtual currency (e.g., Bitcoin™) for validating the received data and for generating updated versions of the hybrid block-chain ledger.

Exemplary Processes for Tracking Assets Using Hybrid Private-Public Ledgers

In some embodiments, client devices 101, 102, and 103, and system 110 may execute one or more stored applications that enable corresponding users to track, in conjunction with peer systems 112 and other components of system 100, a disposition and distribution of one or more terms using conventional, publicly available and transparent block-chain ledgers. In some aspects, the use of public block-chain ledgers to track completion of terms and release of funds (e.g., unit of virtual currencies, such as Bitcoin™, unit of other financial instruments and securities, physical assets, etc.) may present advantages over existing centralized server systems, such as those provided by financial institutions that leverage private ledgers.

Exemplary Hybrid Public-Private Block-Chain Ledger Architectures

Various embodiments address problems associated with conventional block-ledger architectures in a technical manner, by providing computer-implemented systems and methods that augment a conventional block-chain ledger with a private-master encryption key architecture that, in conjunction with public and private block-chain keys associated with client devices 101, 102, and 103 at construction site 104, selectively encrypt ledger data to monitor the construction project and update terms of a predetermined construction schedule that are maintained within the block-chain ledger.

By incorporating an encrypted rules engine and corresponding list of triggering events (e.g., an event triggers list) into each block of the conventional block-chain ledger architecture (and thus generating a hybrid, public-private block-chain architecture), computer-implemented systems and methods in accordance with various embodiments may perform operations that enable lenders, such as business entity 150, to track the construction project by identifying when terms in the predetermined construction schedule are completed, while maintaining the public availability and verification characteristic of conventional block-chain ledgers.

Discrete data blocks of the conventional block-chain ledgers (e.g., as outlined above in reference to FIG. 2) and of the hybrid block-chain ledgers (e.g., as described be in reference to FIG. 3) may include common elements of data that may specify transactions that enable the monitoring of terms being completed at construction site 1104. For example, these common data elements may include, but are not limited to, input data that references one or more agreed upon terms in a predetermined construction schedule (e.g., a cryptographic hash of the one or more transactions or terms), a signal or message that is received when a term has been completed at construction site 104, and a digital signature applied to the input and/or signal or message data using a corresponding private key of client device 101, 102, and 103. Various embodiments are, however, not limited to exemplary transactions that include a completion of terms and to the exemplary data elements described above, and in further embodiments, discrete blocks of the hybrid block-chain ledgers may represent any other transaction appropriate to the monitoring of the construction project and any other data appropriate to the construction project and to the transaction or term.

In contrast to conventional block-chain ledgers, various embodiments may establish a "centralized authority" capable of vetting real-time transactions (e.g., distributions, transfers, and/or other actions) involving portions of terms being tracked within the exemplary hybrid block-chain ledger architectures described herein, and capable of establishing and maintaining rules (e.g., through a rules engine and corresponding list of triggering events) that facilitate regulatory-based, policy-based, and customer-specified or lender-specified controls of transactions or terms related to the construction entity.

For example, business entity 150 may represent the centralized authority, and one or more computing components of system 150 may perform operations that establish the rules engine and the list of triggering events, which may be stored within a secure data repository (e.g., data repository 144). In some aspects, the generated and stored rules engine may identify one or more rules that regulate the terms being monitored, an initiation of one or more transactions involving the terms (e.g., the release of funds), and further, any other action involving the terms and/or the hybrid public-private ledger (e.g., processes that generate additional blocks for new terms, processed that generate cryptographic key sets for users, processes that identify completion of terms in the hybrid public-private ledger, etc.). The generated and stored list of triggering events may include information that specifies causal relationships between one or more of the established rules and one or more events that trigger an initiation of one or more corresponding regulated distributions, transactions, and/or actions associated with terms of the predetermined construction schedule being tracked within the hybrid public-private ledger (e.g., the triggering events).

System 110 may establish one or more of the rules and/or triggering events to reflect changes to a construction project due to, for example, various weather conditions. For example, system 110 may establish a term that was not in the existing agreed upon construction schedule as a "triggering event" that would cause system 110 to perform operations that create a new transaction and generate a new block to update the existing distributed ledger. In other aspects, system 110 may establish one or more of the rules and/or triggering events based on information received from a user (e.g., as input provided to a web page or other graphical user interface (GUI) presented by a computing device (not shown) and provided to system 110). For example, business entity 110 may specify a particular distribution of funds (e.g., payment to the developer or owner of the construction project) in response to one or more terms of the predetermined construction schedule being completed (e.g., triggering events).

In further contrast to conventional block-chain ledgers, one or more computing components of system 110 (e.g., server 142 upon execution of stored instructions) may generate additional cryptographic keys that facilitate the exemplary regulation of transactions (e.g., distributions, completion of terms, and/or actions) involving the terms being tracked within the hybrid public-private ledger. By way of example, system 140 may generate a master cryptographic key with which system 110 may encrypt the generated and stored rules engine. In some aspects, system 110 may store copies of the generated master key in a portion of data repository 144 that is not accessible to users, thus maintaining confidence in the generated master key.

System 110 may also perform operations that encrypt the generated list of triggering events, either alone or in conjunction with metadata identifying the centralized authority and/or information facilitating processing of the transaction blocks throughout the hybrid block-chain ledger. System 110 may also perform operations that generate and maintain additional private cryptographic keys (e.g., a private "crypto" key) associated with each client device 101, 102, and 103, and associated with the terms being tracked within the hybrid block-chain ledger. The private crypto keys enable the users, such as the developer or owner of the construction site, to decrypt and access the list of triggering events and the metadata identifying the centralized authority. System 110 may store copies of the generated private crypto keys in a portion of data repository 144. Furthermore, system 110 may also perform operations that provide corresponding ones of the private crypto keys to users through secure, inaccessible, and/or out-of-band communications.

Various embodiments may also be configured to communicate the encrypted and/or hashed rules engine and list of triggering events to users associated with, the tracked terms of the construction project through "in-band" communication processes, such as through an incorporation of the encrypted rules engine and list of triggering events into the transaction blocks of the hybrid block-chain ledger. For example, system 110 may perform operations that hash the encrypted rules engine and list of triggering events into a genesis block of the hybrid block-chain ledger, the contents of which may be incorporated (e.g., by client devices 101, 102, and/or 103, peer systems 112, etc.) into each of the subsequent transaction blocks generated and appended to the hybrid block-chain ledger. In some aspects, by incorporating the hashed and encrypted rules engine and list of triggering events into blocks of the hybrid block-chain ledger, various embodiments may ensure that the established rules are followed even in an event of actions by malicious parties to disrupt the tracked assets (e.g., instances of Bitcoin™ peeling, etc.)

The additional private crypto keys held by the owners and/or users (e.g., stored in corresponding ones of client devices 101, 102, and/or 103, and accessible to executable application programs) may enable the users to access the encrypted list of triggering events maintained within the hybrid block-chain ledger. The users may, through corresponding client devices or computing devices, view the individual events that, when detected by system 110, could cause system 110 to perform operations that authorize and/or verify the transaction within the hybrid block-chain ledger (e.g., associated with corresponding portions of the tracked terms).

One or more computing components of system 110 may perform operations that modify portions of the stored rules and/or list of triggering events, e.g., in response to changes in regulations and/or policies, in response to changes with the construction project, and in response to additional owner/developer input, etc. In order to access and modify the generated rules engine (and/or the list of triggering events) maintained within the hybrid block-chain ledger, system 110 may leverage the stored master cryptographic key to access and modify the hashed and encrypted rules engine. System 110 may encrypt and re-hash the modified rules engine and submit the encrypted and hashed modified rules engine to one or more of peer systems 112 for inclusion in a block of the hybrid block-chain ledger. For example, one or more of peer systems 112 may incorporate the hashed and encrypted modified rules engine into the hybrid block-chain ledger as a special or new transaction (e.g., a "0" value transaction), such that the hybrid block-chain ledger tracks each change within the modified rules engine.

Figure 3:
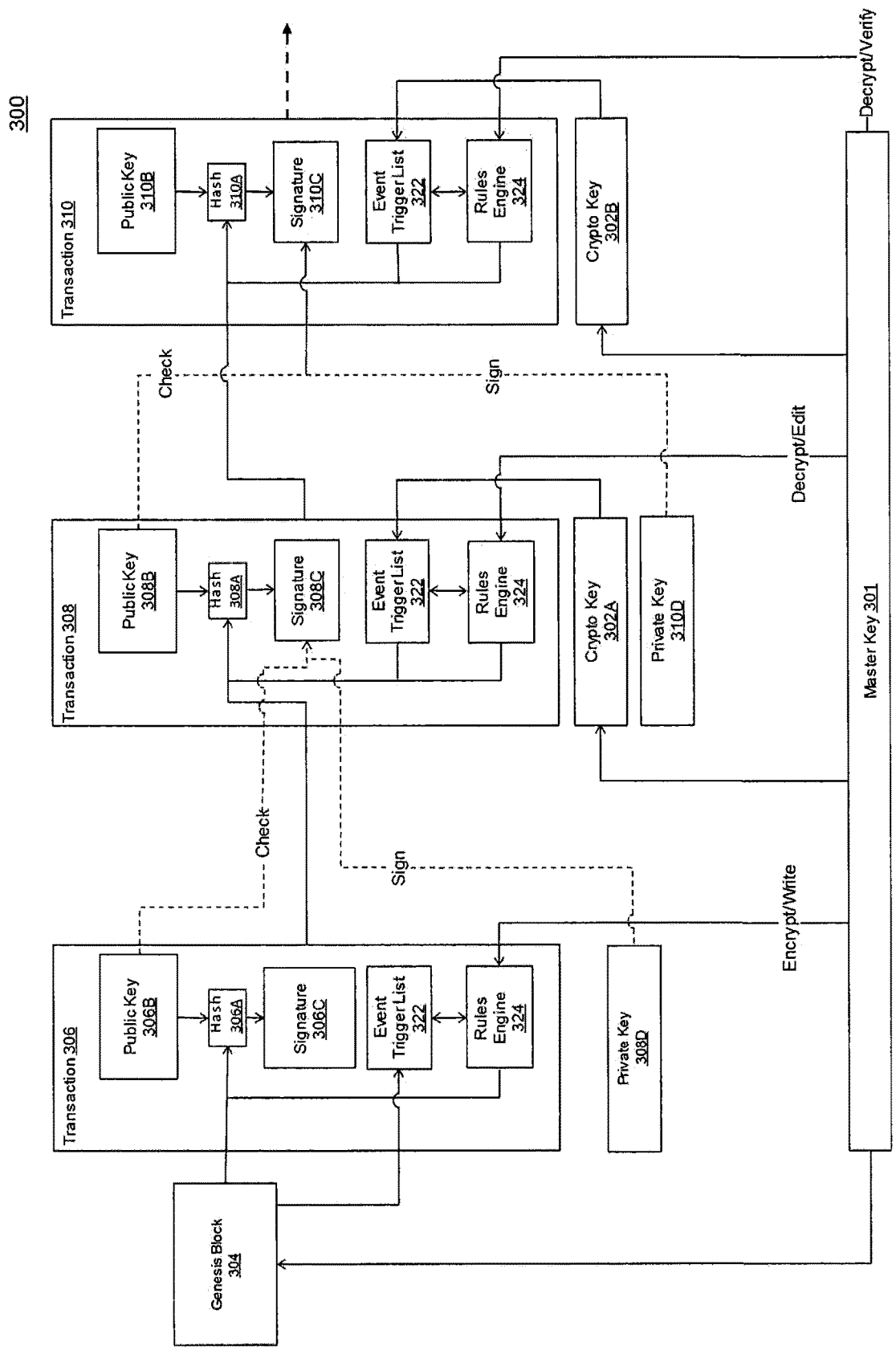
FIG. 3 is a diagram of a hybrid public-private block-chain ledger architecture in accordance with some embodiments.

FIG. 3 is a schematic diagram illustrating an exemplary structure 300 of a hybrid, public-private block-chain ledger, which may be generated through the interaction of components of system 100 in accordance with various embodiments. For example, as described with reference to FIG. 3, sensors 105, 106, and 107 (shown in FIG. 1) may be associated with corresponding devices (e.g., client devices 101, 102, and 103) (shown in FIG. 1), which may be configured to execute one or more stored software applications (e.g., a wallet application) capable of obtaining a current version of a hybrid block-chain ledger from one or more networked computer systems (e.g., one of peer systems 112 (shown in FIG. 1) configured to "mine" broadcast transactions and update ledgers).

A system associated with a centralized authority (e.g., system 110 (shown in FIG. 1) associated with business entity 150) may generate a rules engine that regulates transactions involving the terms being tracked by the hybrid block-chain ledger (e.g., distributions, completion of terms, other actions, etc.) and a list of triggering events that, upon detection by system 110, trigger an initiation of one or more of the distributions, record of the completion of terms, and/or other actions regulated by the generated rules engine. System 110 may generate a master encryption key (e.g., master key 301 of FIG. 3), which may be maintained in a portion of data repository 144 (shown in FIG. 1), and may generate additional private "crypto" keys 302A and 302B, which may be associated with corresponding ones of client devices 101 and 102. In some aspects, system 110 may maintain private crypto keys 302A, 302B, and 302C in a portion of data repository 144 and provide private crypto keys 302A, 302B, and 302C to client devices 101, 102, and 103, respectively through secure, out-of-band communications.

System 110 may encrypt the generated rules engine and the generated list of triggering events, and may perform operations that hash the encrypted rules engine and list of triggering events into a genesis block of the hybrid block-chain ledger (e.g., genesis block 304). For example, a current version of a hybrid block-chain ledger, including genesis block 304, can be a distributed ledger or listing for the construction project that is to take place at construction site 104 (shown in FIG. 1). The block-chain or sequence can include multiple units or blocks that are representative of the agreed upon terms that are agreed upon by business entity 150 and the owner and/or developer of the construction project. and that are part of a predetermined construction schedule. The blocks can also include the sets of data associated with construction site 104, wherein each set of data corresponds to a different term. For example, each set of data can include a different client device 101, 102, or 103 and a different corresponding sensor 105, 106, or 107 associated with the corresponding terms.

Users, such as, inspectors or employees associated with the construction project can obtain the current version of the hybrid block-chain ledger. For example, the user can use a device, such as client device 101, and may execute a stored software application (e.g., a wallet application) capable of obtaining the current version of a hybrid block-chain ledger, including genesis block 304, from one or more networked computer systems (e.g., one of peer systems 112 configured to "mine" broadcast transactions and update ledgers).

For example, client device 101 may obtain the current hybrid block-chain ledger and process the hybrid block-chain ledger to determine what terms are associated with the predetermined construction schedule for the construction project at construction site 104. One or more of peer systems 112 may have previously verified, processed, and packed data associated with transaction 306, which may be in a corresponding block of the block-chain.

As illustrated in FIG. 3, data specifying transaction 306 may include input data based on a signal received from sensor 105 that one term related to the construction project has been completed, and further, output data that includes instructions for transferring the information that the term has been completed to business entity 150 and/or to the owner and/or developer of the construction project. For example, input data in accordance with various embodiments may include a cryptographic hash of the term that has just been completed (e.g., hash 306A), and output data in accordance with various embodiments may include details of the term that has been completed in transaction 306 and a public key 306B of, for example, business entity 150. Further, in some aspects, the transaction data may include a digital signature 306C of client device 101, which may be applied to hash 306A and public key 306B using a private key of client device 101 through any of a number of techniques apparent to one of skill in the art and appropriate to the block-chain ledger architecture.

Further, and in contrast to the conventional block-chain ledger architectures described above, transaction 306 may also include encrypted and/or hashed copies of rules engine 320 and trigger event list 322. A device being used by business entity 150, such as server 142 (e.g., which may execute one or more software applications), may access genesis block 304 (e.g., from the current version of the hybrid block-chain ledger obtained from one or more of peer systems 112), may parse genesis block 304, and may extract copies of the encrypted and/or hashed rules engine 324 and trigger event list 322. Business entity's device may transmit to one or more of peer systems 112 the hash 306A, public key 306B, and digital signature 306C for verification, processing (e.g., additional cryptographic hashing) and inclusion into a new block of the hybrid block-chain ledger that the term has been completed.

In an embodiment, client device 102 may receive a signal from sensor 106 that another term has been completed on construction site 104. For example, the one or more software applications executed by client device 102 may cause client device 102 to perform operations that generate input and output data specifying a new transaction (e.g., transaction 308 of FIG. 3) that another term has been completed, and further, that transmit the generated data to one or more of peer systems 112 for verification, processing (e.g., additional cryptographic hashing) and inclusion into a new block of the hybrid block-chain ledger that the term has been completed.

For example, data specifying transaction 308 may include a cryptographic hash 308A of prior transaction 306, information regarding the term that had been completed in transaction 308, and a public key of the recipient (e.g., public key 308B of, for example, business entity 150). The data specifying transaction 308 may include a digital signature 308C of client device 102, which may be applied to hash 308A and public key 308B using a private key 308D of client device 102. The presence of business entity's public key within transaction data included within the conventional block-chain ledger may enable various devices and systems (e.g., client devices 101, 102, and/or 103, peer systems 112, etc.) to verify digital signature 308C, as applied to data specifying transaction 308.

In some embodiments, client device 102 may also parse data specifying prior transaction 306 (e.g., as obtained from the current version of the hybrid block-chain ledger) and extract encrypted and/or hashed copies of rules engine 324 and trigger event list 322. Client device 102 may append the encrypted and/or hashed copies of rules engine 324 and trigger event list 322 to the data specifying transaction 308 (e.g., cryptographic hash 308A, public key 308B, and digital signature 308C), and transmit the data specifying transaction 308B to one or more of peer systems 112 for verification, processing (e.g., additional cryptographic hashing) and inclusion into a new block of the hybrid block-chain ledger.

Private crypto key 302A may enable client device 102 to access encrypted event trigger list 322 upon extraction from the hybrid block-chain ledger. In some embodiments, private crypto key 302A provides client device 102 with read-only access to the encrypted event trigger list 322. Client device 102 may obtain private crypto key 302A from system 140 using secured out-of-band communications or as input provided by a user through a web page or other graphical user interface (GUI) presented by client device 102.

After the completion of the terms have been verified and indicated as complete, the funds related to an associated phase of the construction project can then be transferred from business entity 150 to the owner and/or developer of the construction project upon verification and publication of the data specifying transaction 308 within a corresponding block of the hybrid block-chain ledger by peer systems 112.

Sensor 107 may detect a completion of another term for a different phase of the construction project and transmit a signal representative of the completion of the term to client device 103. For example, the one or more software applications executed by client device 103 may cause client device 103 to perform operations that generate input and output data specifying a new transaction (e.g., transaction 310 of FIG. 3) that identifies the completion of the term, and that transmits the generated data to one or more of peer systems 112 for verification, processing (e.g., additional cryptographic hashing) and inclusion into a new block of the hybrid block-chain ledger that the term has been completed.

Data specifying transaction 310 may include a cryptographic hash 310A of prior transaction 308, information related to the term being completed in transaction 310, and a public key 310B of, for example, business entity 150. The data specifying transaction 310 may include a digital signature 310C of client device 103, which may be applied to hash 310A and public key 310B using a private key 310D of client device 103. The presence of public key 308B within transaction data included within the hybrid block-chain ledger may enable various devices and systems (e.g., client devices 101, 102, and/or 103, peer systems 112, etc.) to verify digital signature 310C, as applied to data specifying transaction 310.

Client device 103 may also parse data specifying prior transaction 308 (e.g., as obtained from the current version of the hybrid block-chain ledger) and extract encrypted and/or hashed copies of rules engine 324 and trigger event list 322. Client device 103 may append the encrypted and/or hashed copies of rules engine 324 and trigger event list 322 to the data specifying transaction 310 (e.g., cryptographic hash 310A, public key 310B, and digital signature 310C), and transmit the data specifying transaction 310 to one or more of peer systems 112 for verification, processing (e.g., additional cryptographic hashing) and inclusion into a new block of the hybrid block-chain ledger. Funds related to the completion of the term may be transferred from business entity 150 to the owner and/or developer of the construction project upon verification and publication of the data specifying transaction 310 within a corresponding block of the hybrid block-chain ledger by peer systems 112.

Private crypto key 302B may enable client device 103 to decrypt event trigger list 322 upon extraction from the hybrid block-chain ledger. Client device 103 may obtain private crypto key 302B from system 110 using secured out-of-band communications, and additionally or alternatively, as input provided by a user through a web page or other graphical user interface (GUI) presented by client device 103. Client device 103 may identify and extract private crypto key 302B from a portion of the hybrid block-chain ledger obtained from peer systems 112 (e.g., as a secure in-band communication).

In the embodiments described above, system 110 may establish and maintain rules (e.g., through a rules engine and corresponding list of triggering events) that facilitate regulatory-based, policy-based, and/or customer-specified controls of transactions involving the terms being tracked or tracked assets within a hybrid block-chain ledger. For example, client devices 101, 102, and/or 103 may generate transaction data that includes a rules engine and list of triggering events, and one or more of peer systems 112 may embed the generated transaction data into blocks of the hybrid block-chain ledger for reference in subsequent transactions. System 110 may be configured to detect an occurrence of an event (e.g., based on data received from client devices 101, 102, and/or 103, etc.), and may determine whether the list of triggering events includes the detected event, and when the triggering event list includes the detected event, perform one or more operations consistent with an established rule that references the detected event, as described in more below detail with reference to FIG. 4.

Figure 4:
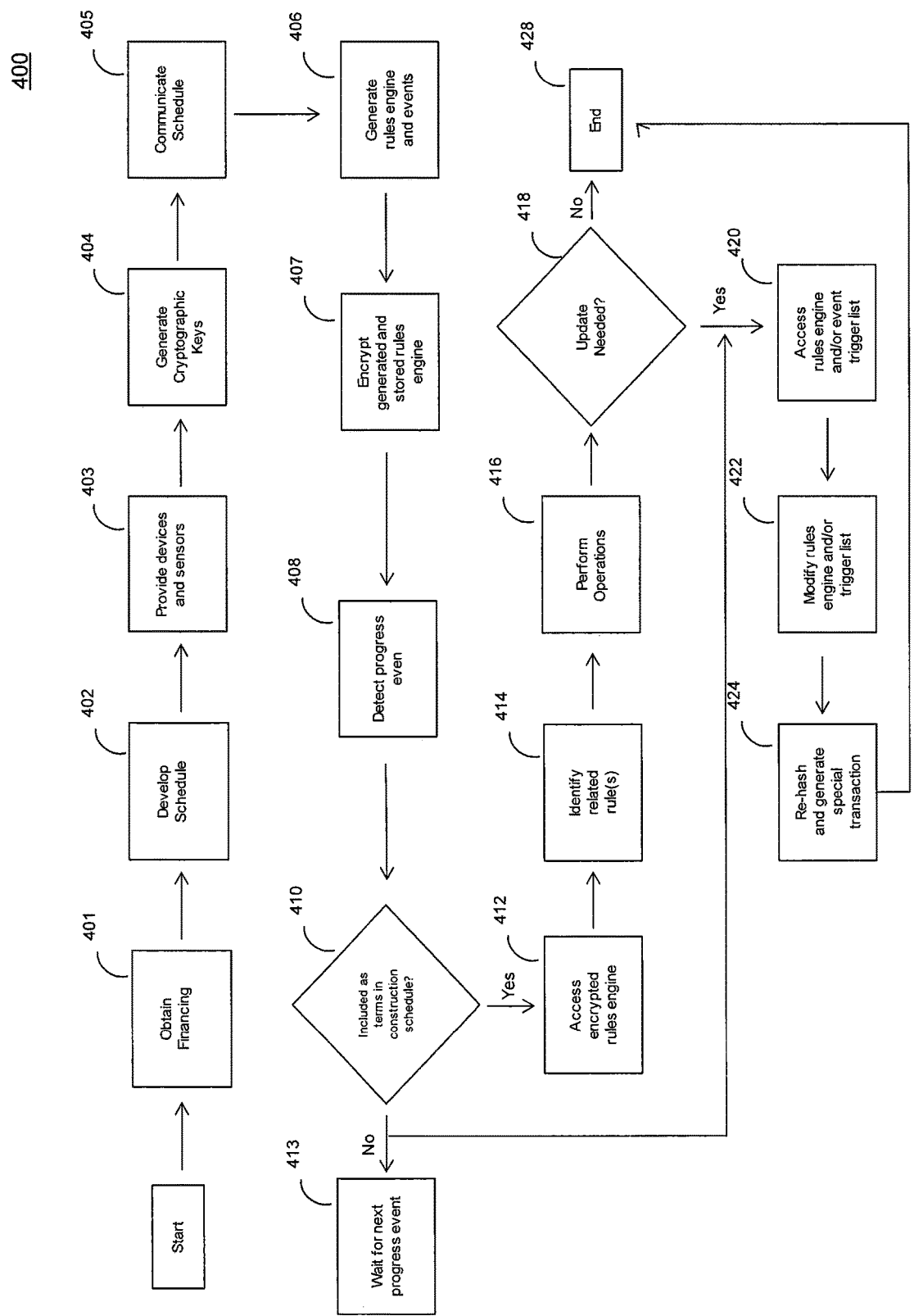
FIG. 4 is a flow diagram of a method for monitoring at least one construction project using a hybrid public-private block-chain ledger in accordance with some embodiments.

FIG. 4 is a flow diagram 400 of an exemplary method for monitoring at least one construction project using a hybrid block-chain ledger in accordance with some embodiments, via system 100 (shown in FIG. 1). In an embodiment, a centralized authority may be assigned to establish regulatory-based, policy-based, and/or customer-specified control over terms being tracked and/or funds or assets tracked within the hybrid block-chain ledger. In some aspects, the terms being tracked can include the agreed upon terms between business entity 150 (shown in FIG. 1) and an owner and/or developer of a construction project that are incorporated into a predetermined construction for the construction project, wherein business entity 150 is financing the project and wherein funds can be incrementally released by business entity 150 in phases upon completion of terms associated with the phases. Tracked assets, in accordance with various embodiments, may include units of a virtual currency or a crypto-currency, units of financial instruments held by one or more owners, and physical assets utilized by one or more individuals and/or entities. In some aspects, a computer system associated with the centralized authority (e.g., system 110 (shown in FIG. 1)) associated with business entity 150) may execute one more stored application programs to cause system 110 to recover, authorize, audit, and/or release at least a portion of the tracked assets and/or transactions involving the tracked assets based on established and maintained rules.

In step 401, an owner and/or developer of a construction project can obtain financing from a lender, such as business entity 150, for the construction. Upon receiving approval for the financing, in step 402, the owner and/or developer can negotiate and develop a construction schedule with business entity 150. In some embodiments, when financing a construction project, business entity 150 may negotiate a construction schedule in which the financing for the construction project will be disbursed incrementally in phases upon the completion of terms. For example, in some embodiments, certain terms are to be completed in phase one of the construction project and another set of terms are to be completed in phase two of a construction project. The funds will be disbursed at for each phase after it is shown and verified that the respective terms have been completed. Accordingly, in some embodiments, the construction schedule can include the terms of the construction project and when each of the terms are to be completed, along with the dates for when funds are to be disbursed to the owner and/or developer of the construction project or to third parties associated with the construction project.

In step 403, devices and sensors, such as client devices 101, 102, and 103 (shown in FIG. 1), and respective sensors 105, 106, and 107 (shown in FIG. 1), are provided to the owner and/or developer to use on the construction site of the construction project, construction site 104 (shown in FIG. 1). Sensors 105, 106, and 107 can detect when terms of the contract are completed and communicate the information to respective client device 101, 102, and 103. Client devices 101, 102, and 103 can, in turn, communicate the information to business entity 150. In some embodiments, client devices 101, 102, and 103 and sensors 105, 106, and 107 can be positioned on site 104 based on the agreed upon terms. For example, each client device 101, 102, and 103, and each respective sensor 105, 106, and 107 can be associated with a particular set of terms related to each phase of the construction project. As such, sensor 105 and client device 101 may only detect and communicate their corresponding terms.

In order to ensure proper privacy access and restrictions when tracking the funds and the construction schedule, business entity 150, using one or more computing components of system 110, may generate cryptographic keys that facilitate the exemplary regulation of transactions (e.g., distributions, transfers, and/or actions) involving assets tracked within the hybrid public-private ledger (e.g., in step 404). For example, in step 404, system 110 generates a master cryptographic key with which system 110 may encrypt the generated and stored rules engine. In some aspects, certain aspects, system 110 may store copies of the generated master key in a portion of data repository 144 (shown in FIG. 1) that is not accessible to users, thus maintaining confidence in the generated master key.

In step 404, system 110 may also perform operations that generate and maintain additional private cryptographic keys (e.g., private "crypto" keys) associated with each user who may be an owner and/or developer of the construction project and the recipient of the assets tracked within the hybrid block-chain ledger. The generated private crypto keys may enable a device of each user to decrypt and access the list of triggering events and additionally or alternatively, metadata identifying the centralized authority. System 110 may store copies of the generated private crypto keys in a portion of data repository 144. Furthermore, system 110 may also perform operations that provide corresponding ones of the private crypto keys to client devices 101, 102, and 103 through secure, non-accessible and/or out-of-band communications.

In step 405, the negotiated schedule is communicated to the parties involved an in the financing of the construction project. The schedule can be communicated using electronic means, such via e-mail, using system 110. In addition, in some embodiments, data regarding client devices 101, 102, and 103 and sensors 105, 106, and 107 can also be communicated to the parties. The data can be included as a plurality of sets, wherein each set includes information regarding a separate client device and the respective sensor. The data set can include information, such as the terms of the construction schedule that are being tracked by the client device and respective sensor and the location of each on construction site 104. The schedule and data sets can be obtained by system 110 by manual input from an employee of business entity 150, for example. The schedule and data sets can also be stored in system 100. Each of the sets of data can be received from one of a different sensor of the sensors 105, 106, and 107 associated with the corresponding term or a different device of the client devices 101, 102, and 103.

In step 406, one or more computing components of system 110 may generate a rules engine and a list of triggering events, in step 402, which may be stored within a portion of data repository 144. In some embodiments, the generated and stored rules engine may identify or more rules that regulate a distribution of the tracked assets, an initiation of one or more transactions involving the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for users, processes that recover assets tracked in the hybrid public-private ledger, etc.). The generated and stored list of triggering events may include information that specifies causal relationships between one or more of the established rules and one or more events that trigger an initiation of one or more corresponding regulated distributions, transfers, and/or actions involving assets tracked within the hybrid public-private ledger (e.g., the triggering events). In some embodiments, system 110 may establish a completion of a term as a "triggering event" that would cause system 110 to perform operations to enable the release of funds for the construction project after receiving appropriate credentials from the party that is contracted with business entity 150 to receive the funds for the project. In some embodiments, system 110 performs operations that generate a new pair of public and private block-chain keys for the owner and/or developer of the construction project in response to a verification of particular authentication credentials.

System 110 may generate, in step 406, one or more of the rules and/or triggering events based on information obtained from a user, such as the owner and/or the developer of the construction project (e.g., as input provided to a web page or other graphical user interface (GUI) presented by a computing device, such as client device 101 and provided to system 110). For example, a user may specify a particular distribution of tracked assets (e.g., recurring bill payments, etc.) in response to a completion of a term in the construction project (e.g., triggering events). In other embodiments, system 110 may obtain the information from a user, such as business entity 150. Various embodiments are, however, not limited to these exemplary triggering events and corresponding rules, and in further embodiments, system 110 may establish any additional or alternate rules and/or triggering events appropriate to the tracked assets, to business entity 150, and further, to the users.

In step 407, system 110 may perform operations that encrypt the generated and stored rules engine (e.g., using the master encryption key) and further, that encrypt the generated and stored list of triggering events (e.g., using any technique that facilitates decryption using the private crypto keys). For example, system 110 may perform operations in step 406 that hash the encrypted rules engine and list of triggering events into a genesis block of the hybrid block-chain ledger, the contents of which may be incorporated into each of the subsequent transaction blocks generated and appended to the hybrid block-chain ledger. For example, each block may contain a separate term of the construction schedule and the location of the corresponding client device (e.g., client devices 101, 102, or 103) and corresponding sensor (e.g., sensors 105, 106, or 107). By incorporating the hashed and encrypted rules engine and list of triggering events into the blocks of the hybrid block-chain ledger, various embodiments may ensure that the established rules are followed even in an event of actions by malicious parties that disrupt the tracked terms and/or assets (e.g., instances of Bitcoin™ peeling, etc.).

In some embodiments, one or more computing components of system 110 may detect an occurrence of a progress event or a transaction, such as a completion of a term, in step 408. For example, in some embodiments, sensor 105 may detect a progress event, such as a completion of a term, and may transmit a signal to client device 101 to notify client device 101 that a term has been completed. Client device 101 may process the signal and transmit the data obtained from the signal to system 110. In other instances, system 110 may detect an event, in step 408, based on data received across network 120 from one or more systems associated with local, state, and/or federal governmental entities (e.g., data from a law enforcement system notifying business entity 150 of a completion of a term). Various embodiments are, however, not limited to these exemplary events, and in further embodiments, system 110 may be configured to detect any additional or alternate event appropriate to the tracked assets and to the components of system 100.

System 110 may also be configured to access the stored list of triggering events (e.g., within database 144), and may identify or determine whether the list of triggering events includes the detected event (e.g., in step 410). For example, in some embodiments, in step 410, system 110 identifies whether the received progress event or completed term corresponds to one of the terms in the construction schedule. If system 110 identifies the detected event as being one of the terms (i.e., triggering events) in the construction schedule (e.g., step 410; YES), system 110 may establish the detected event as a triggering event, and may access the encrypted rules engine using the master encryption key (e.g., in step 412). System 110 may further identify, within the accessed rules engine, one or more of the established rules that are causally related to the detected triggering event (e.g., in step 414). Further, system 110 may be configured to perform one or more operations, either individually or in sequence, that are consistent with the identified rules (e.g., in step 416). For example, the accessed rules engine may include information identifying the one or more operations associated with the identified rules. In other instances, at least one of the performed operations may represent a default operation associated with the identified rules (e.g., a specific type of authentication required before performing the one or more operations on behalf of a user).

In one embodiment, one or more computing components of system 110 may also determine whether to update portions of the generated rules engine and/or list of triggering events (e.g., in step 418). For example, when the detected progress event (i.e., completed term) is identified as being one of the terms in the construction schedule, system 110 may update portions of the generated rules engine and/or list of triggering events in step 418. In other embodiments, system 110 can identify an update or modification to one or more regulations and/or policies promulgated by a governmental entity, a financial regulator, and/or the centralized authority. In other instances, system 110 may obtain from, for example, client device 101, information updating a rule and/or triggering event previously established by system 110 based on input received from a user (e.g., through a web page and/or GUI presented by client device 101).

If system 110 determines to update portions of the generated rules engine and/or list of triggering events (e.g., step 418; YES), system 110 may access appropriate portions of the rules engine and/or list or triggering events in step 420 (e.g., using the master encryption key), and may modify the appropriate portions of the rules engine and/or list of triggering events to reflect the updated terms of the construction schedule, regulations, policies, user-specified rules, and/or user-specified events (e.g., in step 422). In some instances, system 110 may modify the accessed rules engine by adding a new rule, deleting an existing rule, modifying one or more parameters of an existing rule, and/or modifying one or more operations associated with an existing rule. For example, in some embodiments, system 110 may update the distributed ledger representative of the construction schedule by indicating that the corresponding term has been completed or fulfilled, or by simply deleting the corresponding term from the list of triggering events.

In other instances, system 110 may modify the accessed list of event triggers to add a new triggering event. For example, in step 410, if system 110 identifies that the received progress event is not a term that is part of the construction schedule (e.g., step 410; NO), but the term was necessary in view of changes with the construction project, system 110 can still modify the trigger list by adding the new term and by indicating that it has been fulfilled or completed. System 110 may encrypt and re-hash the modified rules engine and/or list of triggering events, and may submit the encrypted and hashed modified rules engine and/or list of triggering events to one or more of peer systems 112 for inclusion in a block of the hybrid block-chain ledger (e.g., in step 424). For example, one or more of peer systems 112 may incorporate the hashed and encrypted modified rules engine and/or list of triggering events into the hybrid block-chain ledger as a special transaction (e.g., a "0" value transaction), such that the hybrid block-chain ledger tracks each change within the modified rules engine and/or list of triggering events.

In some embodiments, in step 410, if system 110 identifies that the received progress event is not a term that is part of the construction schedule (e.g., step 410; NO), system 110 may then decide to wait for the next progress event in step 413. For example, sensor 105 may detect another progress event, such as a completion of another term, and may transmit a signal to notify client device 101. Client device 101 can transmit the data to system 110 such that system 110 can determine whether the new progress event corresponds to one of the terms in the construction schedule and steps 408-424 can be repeated. Similarly, at a later time, sensor 106 may detect another progress event or another term being completed and, a signal is transmitted to client device 102. The information can then be sent to system 110 and steps 408-424 can be repeated.

Referring back to step 418, if system 110 determines that no modification to the rules engine and/or the list of triggering events is warranted (e.g., step 418; NO), the exemplary method may proceed to completion. For example, in some embodiments, after receiving numerous signals throughout the process and updating the rules engine and/or list of triggering events throughout the process, system 110 may conduct a review of the updated rules engine and/or updated list of triggering events to determine if all the terms of the construction schedule have been completed or fulfilled. If all the terms have been completed, then system can determine that no modification is necessary and the process can proceed to the end of the method in step 428.

Moreover, based on when terms are completed, business entity 150 can incrementally disburse the funds for the construction project at different stages upon completion of the corresponding terms. In the embodiments described above, and through the generation of the master cryptographic key and management of the generated rules engine and corresponding list of triggering events, system 110 may perform operations that recover, authorize disbursement, audit, and/or verify at least a portion of the tracked funds or assets and/or transactions involving the tracked funds or assets. The operations performed by system 110, which utilize hybrid block-chain ledgers in accordance with various embodiments, would not be possible using the conventional block-chain ledgers described above.

For example, a user may be a user of a virtual or crypto-currency (e.g., Bitcoin™) and may store a private key (e.g., private key 310D) on a computing device (e.g., client device 101) to generate and confirm Bitcoin™ transactions, such as the completion of terms and the disbursement of funds. In one instance, the user may unfortunately drop the computing device into a pool of water at construction site 104 while confirming a Bitcoin™ with private key 310D, and upon retrieval from the water, the user may establish that the computing device no longer functions and that data on the computing device is not recoverable.

Traditionally, through a device in communication with network 120, the user may access a conventional block-chain ledger, such as those conventional architectures outlined above, and determine that the Bitcoin™ transfer of funds was incomplete when the user dropped the computing device in the water. Further, the user may determine that the Bitcoin™ transaction or completion of a term represents an orphaned block within the conventional block-chain ledger, and the Bitcoins™ associated with the orphaned block are unrecoverable and permanently lost.

In some embodiments, the user may access a hybrid block-chain ledger (e.g., as described with reference to FIG. 3), and may determine that the Bitcoin™ transfer of funds and/or the tracking of the completion of a term was incomplete when the user dropped the computing device into the water. In some embodiments, however, the user may provide input to, for example, a smartphone identifying the unrecoverable private key, which the smartphone may transmit to system 110 across network 120. In some aspects, system 110 may receive the transmitted message (e.g., in step 408), may determine that the user's loss of private key 310D represents a triggering event (e.g., step 410; YES), and may perform operations that authenticate the user's identity and that regenerate a pair of private and public block-chain keys for the user, which system 110 may transmit to the user through any of the secure non-accessible processes outlined above (e.g., in steps 412, 414, and 416). Upon receipt of the newly generated private key, the user may access the hybrid block-chain ledger (e.g., through the smartphone) and confirm the Bitcoin™ transfer to recover the crypto-currency or confirm the completion of a term.

Further, and by way of example, the user may access a wallet application executed by a computing device, such as client device 101 and, further, may determine that the mobile wallet is missing a number Bitcoins™. The user may suspect that the loss of the Bitcoins™ represents a theft by a malicious entity, and through a complex search of a corresponding block-chain ledger (e.g., conventional block-chain ledgers described above, and/or hybrid block-chain ledgers in accordance with various embodiments), the user may trace the theft of the Bitcoins™ to a single transaction within a corresponding block or trace the completion of a term to a single transaction within a corresponding block. The user may contact the police and report the theft, and the police may confirm the accuracy of the user's allegations regarding the theft.

The user may, in some instances, be capable of processing the conventional block-chain ledgers described above to determine an address of the malicious entity responsible for the theft. The decentralized and anonymous nature of conventional block-chain ledgers may, however, prevent the user from identifying the malicious entity, and the stolen Bitcoins™ may remain permanently unrecoverable.

Various embodiments may, however, address the deficiencies of conventional block-chain ledgers and provide the user with recourse to recover the stolen Bitcoins™. For example, the police may notify the centralized authority of the theft of the user Bitcoins™ and provide a destination address associated with the malicious entity (e.g., through a message transmitted to system 110 and received, e.g., in step 408). System 110 may determine that the theft of the Bitcoins™ represents a triggering event included within the generated list (e.g., step 410; YES), and may perform operations that automatically create a request for a new transaction that returns the stolen Bitcoins™ to the user using any of the exemplary techniques described above (e.g., in steps 412, 414, and 416). System 110 may also perform operations that regenerate a pair of private and public block-chain keys for the user, which system 110 may transmit to the user through any of the secure non-accessible processes outlined above (e.g., in steps 412, 414, and 416).

The hybrid block-chain ledger architectures described above may add a level of sophistication to conventional mechanisms for trustless communication by allowing transactions involving the monitoring of construction projects and tracked assets or funds to occur according to common transaction rules. Further, the hybrid block-chain ledger architectures in accordance with various embodiments may allow business entity, such as business entity 150, and/or its customers, such as the owner and/or developer of the construction project to project authority over the monitoring of the construction project and over the tracked assets or funds by establishing customized rules for transaction authorization. Furthermore, and in contrast to conventional techniques described above, the hybrid block-chain ledger architecture may enable a centralized authority (e.g., business entity 150 associated with system 110) to recover, authorize, audit, and/or verify the completion of terms for a construction project and/or the disbursement of tracked assets, such as funds, based on established and maintained rules.

In various embodiments, through the generation of a master cryptographic key and management of a generated rules engine and corresponding list of triggering events, system 110, acting as a centralized authority, may perform operations that recover, authorize, audit, and/or verify the completion of terms for a construction project and/or the disbursement of tracked assets, such as funds. In some aspects, and as outlined above, tracked assets in accordance with various embodiments may include units of a virtual currency or a crypto-currency, units of financial instruments held by one or more owners, and physical assets utilized by one or more individuals and/or entities.

In additional aspects, the exemplary hybrid block-chain algorithms described above may track a location, performance, usage, and/or status of one or more additional client devices (referred to as "connected devices") disposed within computing environment 100 (not shown in FIG. 1), which may be configured to establish communications with client devices 101, 102, and/or 103, and further, with system 110, using any of the communications protocols outlined above. For example, client devices 101, 102, 103, system 110, and the connected devices may be uniquely identifiable and addressable within communications network 120, and may be capable of transmitting and/or receiving data across the established communications sessions. System 110 may be configured to establish the communications sessions with one or more of the connected devices, and to exchange data with the connected devices autonomously and without input or intervention from a user.

In some aspects, the connected devices may be implemented as a processor-based and or computer-based device that includes one or more processors and tangible, computer-readable memories. For example, connected devices in accordance with various embodiments may include mobile communications devices (e.g., mobile telephones, smart phones, tablet computers, etc.) and other devices capable of communicating with client device 101 (e.g., internet-ready televisions, internet-ready appliances and lighting fixtures, computing devices disposed within motor vehicles, etc.). In some embodiments, the connected devices may include sensors, such as sensors 105, 106, and 107, therein in communication with the one or more processors and the memories. System 100 may include one or more additional computing systems in communication with the connected devices using any of the communications protocols outlined above. These additional computing systems may provide additional sensor data to the connected devices using any of the communications protocols outlined above, either a regular intervals or in response to requests from the connected devices. In some instances, the additional computing systems may be implemented as processor-based and/or computer-based systems consistent with the exemplary systems described above.

The connected devices may be configured to transmit portions of the sensor data (e.g., as detected by sensors 105, 106, or 107) to client devices 101, 102, 103 and additionally or alternatively, to system 110, using any of the communications protocols outlined above. For example, the sensor data may characterize an interaction between the connected devices and client devices 101, 102, or 103 (e.g., the monitored data may represent usage data indicative of a consumption of one or more services provided by the connected devices), and the connected devices may transmit the usage data for users to corresponding ones of client devices 101, 102, and 103, which may store the received usage data in a corresponding data repository. The connected devices may also transmit the usage data to system 110, along with information linking specific elements of the usage data to corresponding users and/or client devices.

Various methods can be used to monitor the construction project. For example, in some embodiments, the construction project can be monitored using the systems and methods described in co-pending U.S. patent application Ser. No. 15/235,076 entitled SECURE TRACKING BEACONS USING DISTRIBUTED LEDGERS filed August, 2016, which is incorporated herein by reference in its entirety.

Figure 5:
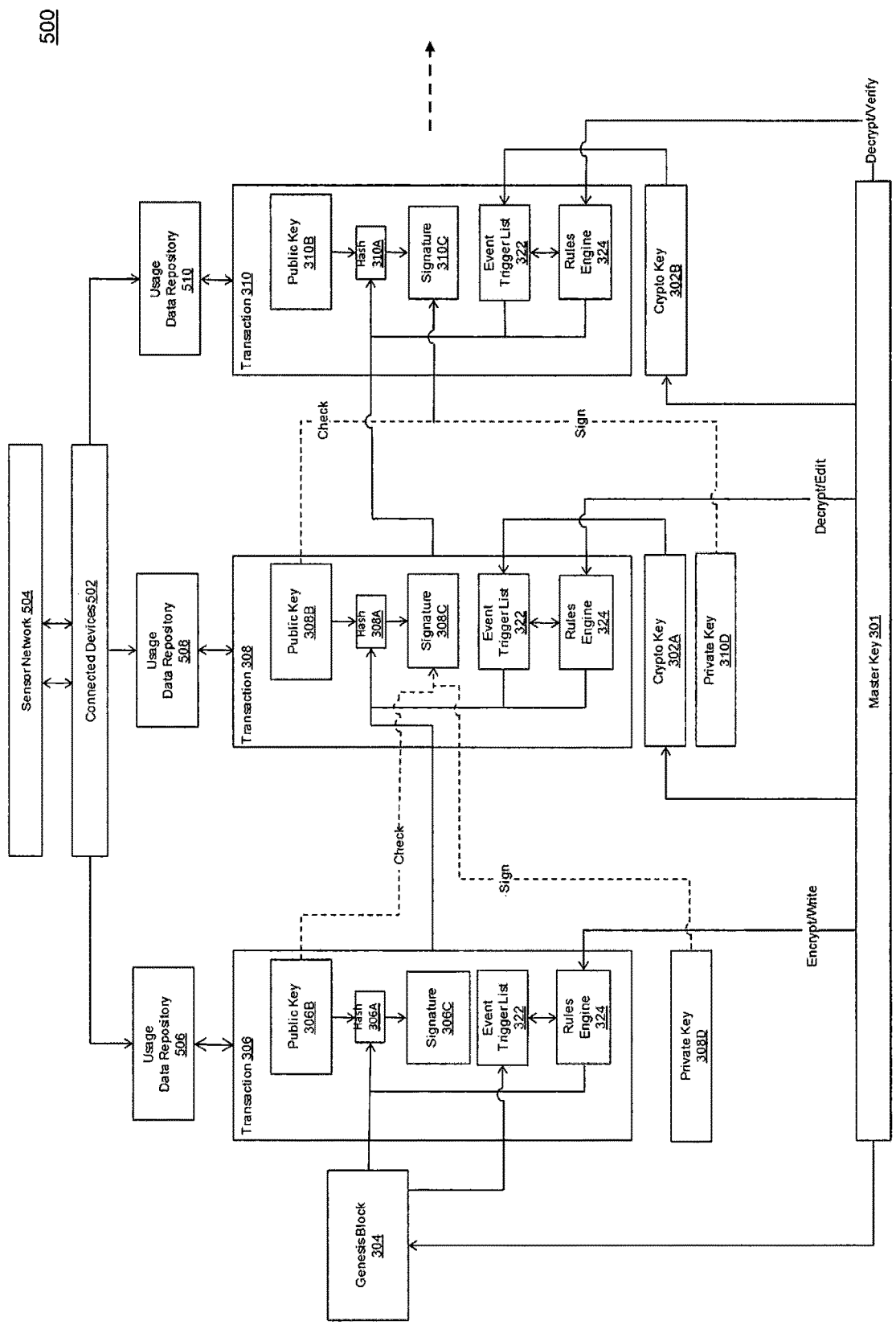
FIG. 5 is a diagram of a hybrid public-private block-chain ledger architecture capable of tracking usage data of users in accordance with some embodiments.

As described in more detail with respect to FIG. 5, client devices 101, 102, and 103 may also incorporate corresponding portions of the monitored data, e.g., as received from the connected devices, into hybrid block-chain ledgers in accordance with various embodiments in order to record, track, and publicly monitor the location, performance, usage, and/or status of the connected devices.

FIG. 5 is a schematic diagram illustrating an exemplary structure 500 of a hybrid, public-private block-chain ledger, which may be generated through the interaction of components of system 100, in accordance with various embodiments. For example, as described in reference to FIG. 4, users may be associated with corresponding devices (e.g., client devices 101, 102, and 103), which may be configured to execute one or more stored software applications (e.g., a wallet application) capable of obtaining a current version of a hybrid block-chain ledger from one or more networked computer systems (e.g., one of peer systems 112 configured to "mine" broadcast transactions and update ledgers).

Embodiments shown in FIG. 5 may incorporate the exemplary hybrid block-chain ledger described above in reference to FIG. 3 (e.g., hybrid block-chain ledger structure 300), and may augment hybrid block-chain ledger structure 300 to include and track monitored data indicative of a location, performance, usage, and/or status of one or more connected devices 502 disposed within environment 100 and in communication with client devices 101, 102, and 103. For example, connected devices 502 may be implemented as processor-based and/or computer-based systems that include one or more processors and corresponding tangible, non-transitory computer-readable memories.

The one or more processors of connected devices 502 may obtain sensor data from one or more on-board sensor devices capable of monitoring connected devices 502 and additionally or alternatively, from one or more external sensor devices disposed within additional computing systems in communication with connected devices 502, such as sensors 105, 106, and 107. The on-board and external sensor devices may, in some aspects, collectively form a sensor network 504 that generates and provides sensor data to the connected devices. For instance, the sensor data may include data identifying a current state, data specifying intended and/or unintended interaction with one or more of the users (e.g., through client devices 101, 102, and/or 103), inadvertent interactions (e.g., drops, other accidental interactions, etc.), and data describing any additional or alternate characteristics of the connected devices capable of being monitored and quantified by the sensor devices. The connected devices may be configured to transmit portions of the received sensor data to corresponding ones of client devices 101, 102, and 103 and to system 110, using any of the communications protocols outlined above (e.g., through peer-to-peer communications, etc.).

For example, the sensor data received by connected devices 502 may specify usage or consumption of one or more services of the connected devices by corresponding ones of the users (e.g., associated with client devices 101, 102, and 103). In some aspects, portions of the usage data attributable to corresponding ones of the users may be transmitted to corresponding ones of client devices 101, 102, and 103 and further, to system 112. The user-specific portions of the usage data may be stored within corresponding user-specific usage data repositories (e.g., usage data repositories 506, 508, and/or 510 of FIG. 5). In some embodiments, as described below in reference to FIG. 5, client devices 101, 102, and/or 103, in conjunction with system 112, may augment the exemplary hybrid block-chain ledger structures described above to include usage data and corresponding metadata, thus enabling the hybrid block-chain ledger to monitor the location, performance, usage, and/or status of the connected devices over time (e.g., during transfers in ownership of the connected devices, use of the connected devices as collateral, etc.).

Figure 6:
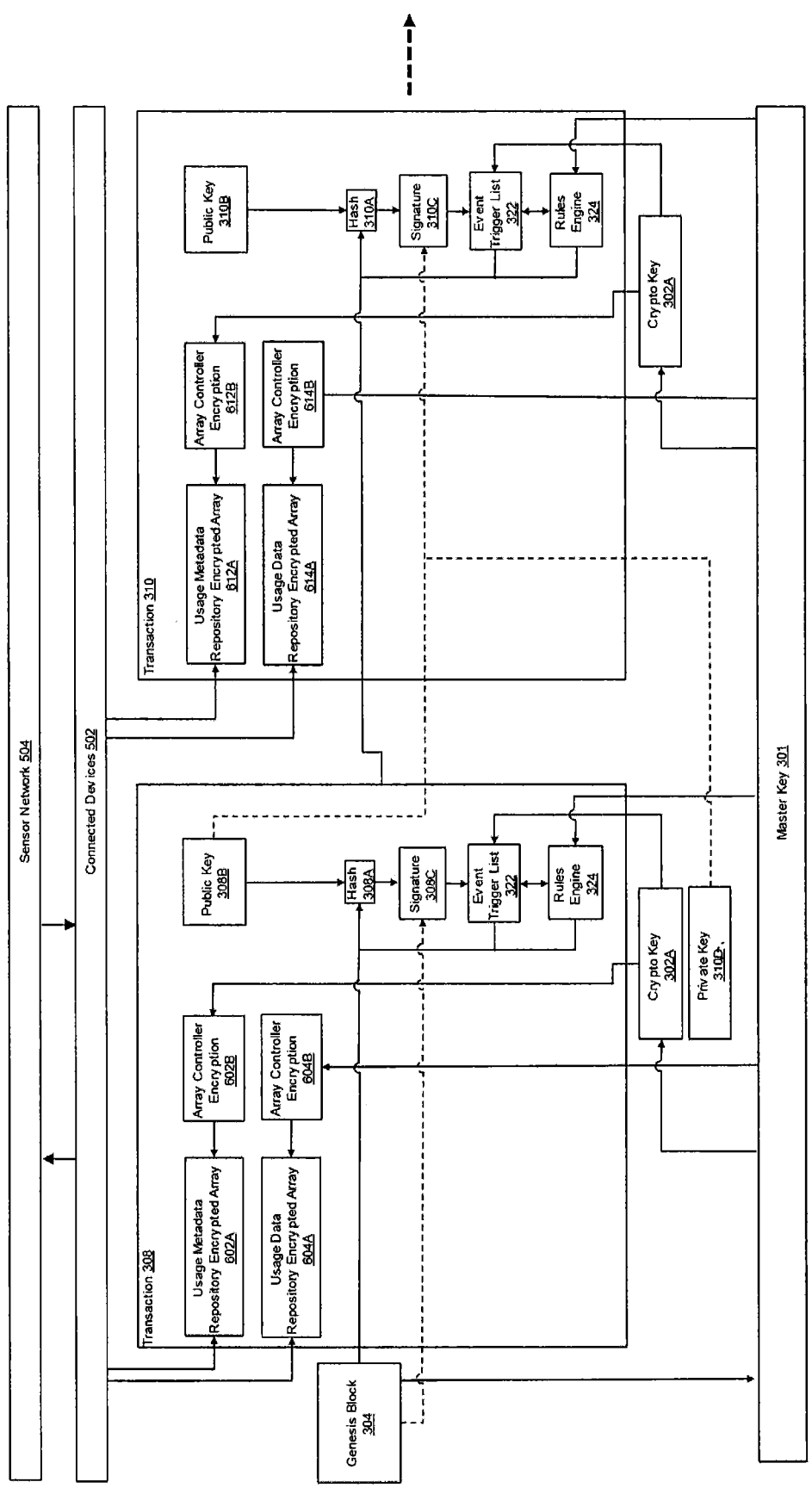
FIG. 6 is a diagram of a hybrid public-private block-chain ledger architecture capable of encrypting usage data and metadata in accordance with some embodiments.

FIG. 6 is a schematic diagram of illustrating an exemplary structure 600 of a hybrid, public-private block-chain ledger, which may be generated through the interaction of components of system 100, in accordance with various embodiments. For example, as described in reference to FIG. 6, users may be associated with corresponding devices (e.g., client devices 101, 102, and 103), which may be configured to execute one or more stored software applications (e.g., a wallet application) capable of obtaining a current version of a hybrid block-chain ledger from one or more networked computer systems (e.g., one of peer systems 112 configured to "mine" broadcast transactions and update ledgers).

Some embodiments shown in FIG. 5 may incorporate the exemplary hybrid block-chain ledger described above in reference to FIGS. 3 and 5 (e.g., hybrid block-chain ledger structures 300 and 500), and may augment hybrid block-chain ledger structure 300 of FIG. 3 to include and track monitored data indicative of a location, performance, usage, and/or status of one or more connected devices 502 disposed within system 100 and in communication with client devices 101, 102, and 103 as received from sensor network 404.

A user may elect to further transfer a portion of tracked assets to an additional user. For example, the one or more software applications executed by client device 101 may cause client device 101 to perform operations that generate input and output data specifying a new transaction (e.g., transaction 308 of FIG. 6) that transfers ownership of the tracked asset portion from one user to another user, and further, that transmits the generated data to one or more of peer systems 112 for verification, processing (e.g., additional cryptographic hashing) and inclusion into a new block of the hybrid block-chain ledger.

For example, data specifying transaction 308 may include a cryptographic hash 308A of a prior transaction, a quantity or number of units of the tracked asset portion that are subject to transfer in transaction 308, and a public key of the recipient (e.g., public key 308B). Further, in some aspects, the data specifying transaction 308 may include a digital signature 308C of the user, which may be applied to hash 308A and public key 308B using a private key 308D of the user. The presence of the user's public key within transaction data included within the conventional block-chain ledger may enable various devices and systems (e.g., client devices 101, 102, and 103, peer systems 160, etc.) to verify the user digital signature 308C, as applied to data specifying transaction 308. Client device 101 may also parse data specifying the prior transaction and extract encrypted and/or hashed copies of rules engine 324 and trigger event list 322.

The data specifying transaction 308 may also include a user's usage data (e.g., as received from connected devices 502), which may be encrypted using master key 301 (e.g., by array controller encryption 604B) to generate an encrypted array 604A of the user's usage data. The data specifying transaction 308 may also include metadata indicative of a duration of usage, time, date, location, and/or other network connected devices in proximity, which may be encrypted using private crypto key 302A of the user (e.g., by array controller encryption 602B) to generate an encrypted array 602A of metadata 602A.

Client device 101 may append the encrypted and/or hashed copies of rules engine 324 and trigger event list 322 to the data specifying transaction 308 (e.g., cryptographic hash 308A, public key 308B, and digital signature 308C) and the usage data (e.g., encrypted arrays 602A and 604A from array controller encryption 602B and 604B), and transmit the data specifying transaction 308 to one or more of peer systems 160 for verification, processing (e.g., additional cryptographic hashing) and inclusion into a new block of the hybrid block-chain ledger.

The user may elect to further transfer that tracked asset portion to yet another user. For example, the one or more software applications executed by client device 102 may cause client device 102 to perform operations that generate input and output data specifying a new transaction (e.g., transaction 310 of FIG. 6) that transfers ownership of the tracked asset portion from one user to the other user, and further, that transmits the generated data to one or more of peer systems 112 for verification, processing (e.g., additional cryptographic hashing) and inclusion into a new block of the hybrid block-chain ledger.

Data specifying transaction 310 may include a cryptographic hash 310A of prior transaction 308, a quantity or number of units of the tracked asset portion that are subject to transfer in transaction 310, and a public key 310B of a user. Further, in some aspects, the data specifying transaction 310 may include a digital signature 310C of the user, which may be applied to hash 310A and public key 310B using a private key 310D of the user. The presence of the user's public key 308B within transaction data included within the hybrid block-chain ledger may enable various devices and systems (e.g., client devices 101, 102, and/or 103, peer systems 112, etc.) to verify the user's digital signature 310C, as applied to data specifying transaction 310.

Data specifying transaction 310 may also include the user's usage data (e.g., as received from connected devices 502), which may be encrypted using master key 301 (e.g., by array controller encryption 614B) to generate an encrypted array 614A of the user's usage data. The data specifying transaction 308 may also include metadata indicative of a duration of usage, time, date, location, and/or other network connected devices in proximity, which may be encrypted using the user's private crypto key 302A (e.g., by array controller encryption 612B) to generate an encrypted array of metadata 612A.

Client device 102 may append the encrypted and/or hashed copies of rules engine 322 and trigger event list 324 to the data specifying transaction 310 (e.g., cryptographic hash 310A, public key 310B, and digital signature 310C) and the usage data (e.g., encrypted arrays 612A and 614A from array controller encryption 612B and 614B), and transmit the data specifying transaction 310 to one or more of peer systems 160 for verification, processing (e.g., additional cryptographic hashing) and inclusion into a new block of the hybrid block-chain ledger.

The inclusion of usage data within hybrid block-chain ledgers maintains a continuous log of usage and/or consumption of connected-device resources by users that generate and submit (through corresponding client devices) transaction data to one or more of peer systems 112. The sensor data (e.g., as received from connected devices 502) may be batched in a periodic set and treated as a transaction, and may be appended into an associated repository of the transaction block-chain (e.g., using system 110, peer systems 112, etc.).

The exemplary block-chain ledgers described above may facilitate processes that track an ownership of one or more of the connected devices and enable current owners, such as an owner and/or developer of a construction project, to transfer ownership to others (e.g., construction third parties). For example, when a new block is created to account for usage data, a private key of the current owner may be used to authenticate the usage and allow for the generation of the new block. A private key linked to a device of the current owner (e.g., stored locally on a memory of the current owner's device) may authenticate the usage and allow for the generation of the new block without input or intervention from the current owner. In some instances, the private key of the current owner's device may differ from the current owner's private key, The automated and programmed authentication of the usage by the current owner's device may reduce instances of under-reported usage data associated with owner-initiated authentication protocols.

Additional Exemplary Use Cases for Hybrid Private-Public Ledgers

Behavior Tracking Using Connected Devices

Various embodiments may enable business entity 150 (e.g., a financial institution) to track users' behaviors and their ability to "care for" and/or "keep in good maintenance" one or more owned items (e.g., connected devices, such as cars, clothing, and appliances) and/or one or more financial obligations (e.g., timely monthly mortgage payments, timely payments of credit card bills, no overdrafts, etc.). For example, business entity 150 may, through system 110, monitor and collect a user's historical behavior data in order to determine a "care score," which may factor into a credit adjudication process for the user. For example, when system 110 accesses a block-chain repository to determine the user's "care score,", system 110 may decrypt the current version of the hybrid block-chain ledger using the master key, and determine a score for either a specific category of products or an overall score based on the sensor data. System 110 may establish the "care rating" for the user based on the determined score. Further, various embodiments may maintain a record of corresponding usage data (e.g., within the disclosed exemplary hybrid block-chain ledgers) and adjust a deprecation value, which system 140 may store along with a unique identifier value as a key value pair.

Various embodiments also facilitate processes that group subsets of connected devices (e.g., various office equipment), track a usage of these connected devices as a group, and aggregate the above-described calculations for the group of connected devices. In some aspects, the tracking and manipulation of group usage data may balance out the heavy use of a singular item with items which are used infrequently.

Each of connected devices 502 may provide data indicative of usage, care, maintenance, and repayments to a centralized server (e.g., a server of system 110), which may perform operations that update a creditworthiness of an owner based on the predicted life of connected devices 502 and risk exposures (e.g., for purposes of providing insurance) in real time. Various embodiments may, for example, reward good behavior from an individual with rewards of better terms and/or penalize poor behavior, and thus customizing both load and insurance product to the individual.

For example, office equipment and a company car of a business owner may represent "connected devices," and various embodiments may monitor usage of the connected devices based on embedded sensors and/or a surrounding network of sensors disposed within in the environment. In some aspects, portions of the office equipment may be used infrequently (e.g., as most of the business is off premises), and system 110 may establish, based on the usage data, that the office equipment experiences a relatively low level of depreciation, while the company car experiences a substantial amount of depreciation. In accordance with various embodiments, system 110 may assign a "medium" deprecation rating to the collective group of connected devices (e.g., the office equipment and the company car) based on the usage data, and system 140 may leverage this information when the business owner attempts to collateralize these connected devices, e.g., in support of a loan application.

Ownership Tracking of Connected Devices and Payment

Additionally, conventional block-chain ledgers are often inadequate to track a partial ownership of various assets, as ownership rights and agreements change over the course of time. Moreover, actual cosigners of loans or accounts may experience difficulty in establishing their own individual responsibility in the instances of partially owned assets.

Hybrid block-chain ledgers in accordance with various embodiments may, in some aspects, provide a shared ledger payment mechanism that, at the time of purchase settlement, assigns ownership to a purchased item by making a connection to the item and embedding the item with an unique owner identifier, timestamp and purchase value. If there is split ownership of the item, various embodiments may record the multiple owners as a value pair and register corresponding percentages of ownership. Various embodiments may further complete registration of the purchased item within the hybrid block-chain ledger, which tracks the ownership and allows the system and/or devices to periodically check-in with the ledger system to maintain a corresponding ownership record.

By tracking partial ownership of assets, hybrid block-chain ledgers in accordance with various embodiments allow for real-time tracking of individual contributions spread over the entire ownership structure. The real-time tracking provided by various embodiments may be useful in partial ownership situations with complex disbursement schemes. For example, system 110 may perform operations that automatically disburse profits according to the ownership and/or disbursement arrangements and/or create new genesis blocks based on the ownership instructions set forth within event trigger list 322 and/or rules engine 324.

For instance, a husband and wife may jointly purchase car for $10,000. Upon the completion of payment for the car, system 110 may determine that husband contributed 60% of the cost, and the wife contributed 40% of the cost. In some aspects, rules engine 324 may include rules establishing joint ownership on the basis of the proportional contributions of the husband and wife, and in the event of divorce (e.g., a triggering event within event trigger list 322), system 100 may distribute the ownership in accordance with rules engine 324. Various embodiments are, however, not limited to property settlements subsequent to divorce, and event trigger list 322 and/or rules engine 324 may include additional data that supports the disbursement of profits upon sales of items and/or within a partnership.

Further, a startup company may exhibit a distributed ownership structure including three co-founders and an investor owner. Rules engine 324 may include an existing payment structure rule that specifies a distribution of profits among the co-founders and the investor. When the startup company is acquired or receives funding, system 140 may detect a triggering event, and rules engine 322 proceeds to create a new ownership structure, and creating a new genesis block.

Automated Ownership Transfers

Using conventional block-chain ledger systems, all entries are made sequentially and are generated in a wide range of applications, which can lead to delays in executing the transactions. Many transactions, however, follow a standardized set of rules based on events associated with the owner. In some aspects, the disclosed hybrid block-chain ledgers may facilitate a transfer of ownership of tracked assets in response to an occurrence of a set of standardized events, thus expediting disbursement and ownership transfers, and reducing the need for protracted analysis of the ownership structures.

Various embodiments may track an ownership of connected devices based on a unique identifier and periodic checks with a network connection, which may be aggregated with associated data (e.g., value, purchase time, usage duration, geo-location, etc.) to form a connected asset inventory system. If items cannot periodically check into the ownership network, system 110 may prompt the customer to reconcile, or a public network may request independent verification.

Various embodiments may also establish a number of predetermined trigger conditions which, when triggered, execute the sale or disbursement and re-allocation of ownership of items registered with the connected asset inventory system. These predetermined instructions may be stored on a ledger system, and the event and completion of the disbursement may be validated by the public "miners" (e.g., peer systems 112).

In some aspects, transactions related to ownership of a particular property may be added to the exemplary hybrid block-chain ledgers described above. System 110, acting on behalf of the centralized authority (i.e., business entity 150) may generate a genesis block in partnership with a manufacturer/retailer at the time of purchase, and/or appends information from a genesis block created by a manufacturer. System 110 may also generate a set of rules for ownership transfer based on input from the individuals involved in the transfer, which may be incorporated into the hybrid block chain ledger as a rules engine (e.g., rules engine 324). Public portions of hybrid block-chain ledgers in accordance with various embodiments may verify a current status of ownership, and when a preset event or criteria is reached (e.g., within event trigger list 322), system 110 performs operations that initiate a transfer of ownership of the property based on the established rules, and the ownership transfer is updated through the distributed network.

For instance, life insurance claims processes may proceed upon a death of a family member and a receipt of an official "certified" death certificate from a governmental entity (e.g., trigger events). Various embodiments may require that the ledger "miners" of peer systems 112 validate the trigger events as well as validate the completion of the "disbursement" or payment event.

During estate planning, various embodiments may "tag" or track every asset that uses a network connection to generate and create rules around automatic disbursements. Upon an event trigger/confirmation (e.g., as specified in event trigger list 322), system 140 automatically puts into effects the rules created by a customer (e.g., as stored within rules engine 324). The automated transfer of ownership may, in some aspects, reduce the workload of an executor and track all changes made to the event triggers, which allows for greater clarity.

Processes for Tracking Earmarked Distributions

Many electronic funds transfers are earmarked for specific uses and/or for specific purchases of certain types of products (e.g., earmarked donations, child support, welfare, child's allowance, some government grants, etc.). Using conventional processes, it may be difficult to track and verify that the allotted funds are used strictly on allowed purchases. Furthermore, using conventional processes, an individual that provides funds may rely on reports that the funds have been used appropriately, and moreover, the appropriate use of funds may often be taken on faith.

In various embodiments, a hybrid block-chain ledger can create and enforce rules controlling transfer of earmarked funds, thus providing a systematic mechanism for tracking and controlling spending. For example, system 110 may establish (e.g., in rules engine 324) a set of allowed transaction rules that enforce the set of earmarks for particular funds.

In some aspects, these systems could be used in international remittance, where funds are sent for specific uses. If the transaction is earmarked for specific items and/or types of items, the established rules may be incorporated into an encrypted event trigger list and/or rules engine (e.g., by system 110) within the transaction block sending the funds overseas. The recipient of the fund will be able to review the trigger events that facilitate a use of the particular funds. If the recipient attempts to use the funds in a way that violates the transaction earmarks, the transaction may be refused, and/or the provider of the fund may be notified.

In some aspects, system 110 may establish rules within the rules engine (e.g., rules engine 324) that allow compliant transactions to proceed, while initiating a set of contingency steps transactions outside of the earmarks. These steps may include notifying the originating party, flagging the transaction, and/or denying the transaction.

For example, a customer of business entity 150 may intend to send money to his parents to repair their roof in a remote village in China. The parents may not have a bank account, so the customer may send the money through an intermediary. The user may worry that intermediary may use the funds inappropriately, leading to an unrepaired roof. In some aspects, the user may transfer funds using the exemplary hybrid block-chain described above, and may establish (e.g., within event trigger list 322 and/or rules engine 324) an earmark for a contractor already selected for the roof repairs. The intermediary believes she can get a better deal by getting the roof repaired by a different contractor. As such, the intermediary may access event trigger list 322 (e.g., using her private crypto key) and determines that the different contractor cannot be paid with the user's funds.

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein may be applied to other embodiments without the use of inventive faculty. The present disclosure is not intended to be limited to the embodiments shown herein, but is to be accorded the widest scope consistent with the principles and novel features disclosed herein The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein may be applied to other embodiments without the use of inventive faculty. The present disclosure is not intended to be limited to the embodiments shown herein, but is to be accorded the widest scope consistent with the principles and novel features disclosed herein.

What is claimed is:

1. A system, comprising:
    a plurality of devices;
    a plurality of sensors that are each configured to couple to one of the plurality of devices; and
    a computing apparatus, wherein the computing apparatus comprises a communications interface, a storage device, and a processor coupled to the communications interface and the storage device, the storage device storing software instructions for controlling the processor that, when executed by the processor, configures the processor to:
        obtain scheduling data associated with a predetermined construction schedule for the a construction project, wherein the predetermined construction schedule includes a plurality of terms;
        generate first ledger blocks that record the scheduling data onto a distributed ledger, wherein each of the first ledger blocks corresponds to a different term of the plurality of terms and a different portion of the scheduling data;
        receive, via the communications interface, a signal from a corresponding one of the plurality of devices, wherein the signal comprises progress event data representative of an occurrence of a progress event detected by a corresponding one of the sensors at a construction site;
        based on the progress event data, determine that the progress event represents a completion of a corresponding one of the plurality of terms in the predetermined construction schedule;
        obtain encrypted triggering event data from at least one of the first ledger blocks, and decrypt the encrypted triggering event data using a private cryptographic key associated with the corresponding one of the plurality of devices;
        determine that the progress event corresponds to at least one triggering event identified within the decrypted triggering event data;
        based on the determination that the progress event corresponds to the at least one triggering event, obtain, from at least one of the first ledger blocks, encrypted rules data identifying rules established by a centralized authority associated with the construction project, and decrypt the encrypted rules data using a master cryptographic key associated with the centralized authority;
        based on the decrypted rules data, perform operations consistent with at least one of the rules that exhibits a relationship with the corresponding term; and
        update at least a portion of the scheduling data to reflect the completion of the corresponding term and generate a second ledger block that records the updated portion of the scheduling data onto the distributed ledger.

2. The system of claim 1, wherein:
    the processor is further coupled to the plurality of sensors;
    the scheduling data comprises a plurality of data sets, each of the data sets corresponding to a different term of the plurality of terms; and the software instructions, when executed, further configure the processor to receive, via the communications interface, each of the sets of data from one of a different sensor of the plurality of sensors associated with the corresponding term or a different device of the plurality of devices.

3. The system of claim 1, wherein the updated portion of the scheduling data comprises an indication for the corresponding term as being fulfilled.

4. The system of claim 1, wherein the software instructions, when executed, further configure the processor to:
store the updated scheduling data within the storage device; and
conduct a review of the updated scheduling data to identify whether each of the plurality of terms in the predetermined construction schedule has been fulfilled.

5. The system of claim 1, wherein the software instructions, when executed, further configure the processor to receive, via the communications interface, a different signal from one of the plurality of sensors when the progress event of the signal is identified as not corresponding to one of the plurality of terms in the predetermined construction schedule, wherein the different signal is representative of a different progress event at the construction site.

6. The system of claim 1, wherein the software instructions, when executed, further configure the processor to:
generate a new construction term for the progress event of the signal when the progress event is identified as not corresponding to one of the plurality of terms in the predetermined construction schedule; and
generate an additional ledger blocks that records data identifying the new construction term onto the distributed ledger.

7. The system of claim 6, wherein the software instructions, when executed, further configure the processor to generate a hash value corresponding to the new construction term.

8. A computer-implemented method, comprising:
obtaining, by at least one processor, scheduling data associated with a predetermined construction schedule for a construction project, wherein the predetermined construction schedule includes a plurality of terms;
generating, by the at least one processor, first ledger blocks that record scheduling data onto a distributed ledger, wherein each of the first ledger blocks corresponds to a different term of the plurality of terms and a different portion of the scheduling data;
receiving, by the at least one processor, a signal from a corresponding one of the plurality of devices, wherein the signal comprises progress event data representative of an occurrence of a progress event detected by a corresponding one of the sensors at a construction site;
based on the progress event data, and by the at least one processor, determining that the progress event represents a completion of a corresponding one of the plurality of terms in the predetermined construction schedule;
by the at least one processor, obtaining encrypted triggering event data from at least one of the first ledger blocks, and decrypting the encrypted triggering event data using a private cryptographic key associated with the corresponding one of the plurality of devices;
determining, by the at least one processor, that the progress event corresponds to at least one triggering event identified within the decrypted triggering event data;
based on the determination that the progress event corresponds to the at least one triggering event, obtaining, by the at least one processor, and from at least one of the first ledger blocks, encrypted rules data identifying rules established by a centralized authority associated with the construction project, and decrypting, by the at least one processor, the encrypted rules data using a master cryptographic key associated with the centralized authority;
based on the decrypted rules data, and by the at least one processor, performing operations consistent with at least one of the rules that exhibits a relationship with the corresponding term, the operations being responsive to the completion of the corresponding term; and
by the at least one processor, updating at least a portion of the scheduling data to reflect the completion of the corresponding term and generating a second ledger block that records the updated portion of the scheduling data onto the distributed ledger.

9. The method of claim 8, wherein:
the scheduling data comprises a plurality of data sets, each of the data sets corresponding to a different term of the plurality of terms; and
the computer-implemented method further comprises receiving each of the sets of data from one of a different sensor of the plurality of sensors associated with the corresponding term or a different device of the plurality of devices.

10. The method of claim 8, wherein the updated portion of the scheduling data comprises an indication for the corresponding term as being fulfilled.

11. The method of claim 8, further comprising:
by the at least one processor, storing the updated scheduling data within the storage device; and
conducting, by the at least one processor, a review of the updated distributed listing to identify whether each of the plurality of terms in the predetermined construction schedule has been fulfilled.

12. The method of claim 8, further comprising receiving a different signal from one of the plurality of sensors when the progress event of the signal is identified as not corresponding to one of the plurality of terms in the predetermined construction schedule, wherein the different signal is representative of a different progress event at the construction site.

13. The method of claim 8, further comprising:
generating, by the at least one processor, a new construction term for the progress event of the signal when the progress event is identified as not corresponding to one of the plurality of terms in the predetermined construction schedule;
generating, by the at least one processor, a hash value corresponding to the new construction term; and
by the at least one processor, generating an additional ledger block that records data identifying the new construction term and the generated hash value onto the distributed ledger.

14. A non-transitory computer-readable storage medium having computer-executable instructions embodied thereon, wherein, when executed by a processor, the computer-executable instructions cause the processor to:
obtain scheduling data associated with a predetermined construction schedule for the construction project, wherein the predetermined construction schedule includes a plurality of terms;
generate first ledger blocks that record scheduling data onto a distributed ledger, wherein each of the first ledger blocks corresponds to a different term of the plurality of terms and a different portion of the scheduling data;

receive a signal from a corresponding one of the plurality of devices, wherein the signal is comprises progress event data representative of an occurrence of a progress event detected by a corresponding one of the sensors at a construction site;

based on the progress event data, determine that the progress event represents a completion of a corresponding to one of the plurality of terms in the predetermined construction schedule;

obtain encrypted triggering event data from at least one of the first ledger blocks, and decrypt the encrypted triggering event data using a private cryptographic key associated with the corresponding one of the plurality of devices;

determine that the progress event corresponds to at least one triggering event identified within the decrypted triggering event data;

based on the determination that the progress event corresponds to the at least one triggering event, obtain, from at least one of the first ledger blocks, encrypted rules data identifying rules established by a centralized authority associated with the construction project, and decrypt the encrypted rules data using a master cryptographic key associated with the centralized authority;

based on the decrypted rules data, perform operations consistent with at least one of the rules that exhibits a relationship with the corresponding term; and update at least a portion of the scheduling data to reflect the completion of the corresponding term and generate a second ledger block that records the updated portion of the scheduling data onto and save the distributed ledger.

15. The non-transitory computer-readable storage medium of claim 14, wherein the updated portion of the scheduling data comprises an indication for the corresponding term as being fulfilled.

16. The non-transitory computer-readable storage medium of claim 14, wherein the computer executable instructions further cause the processor to receive a different signal from one of the plurality of sensors when the progress event of the signal is identified as not corresponding to one of the plurality of terms in the predetermined construction schedule, wherein the different signal is representative of a different progress event at the construction site.

17. The non-transitory computer-readable storage medium of claim 14, wherein the computer executable instructions further cause the processor to:

generate a new construction term for the progress event of the signal when the progress event is identified as not corresponding to one of the plurality of terms in the predetermined construction schedule;

generate a hash value corresponding to the new construction term; and generate an additional ledger block that records data identifying the new construction term and the generated hash value onto the distributed ledger.

18. The system of claim 2, wherein the software instructions, when executed, further configure the processor to delete, from the scheduling data, the data set associated with the corresponding term.

19. The system of claim 1, wherein the software instructions, when executed, further configure the processor to:

modify a portion of the decrypted rules data to reflect the completion of the corresponding term;

encrypt the modified rules data using the master cryptographic key; and generate one or more additional ledger blocks that record the encrypted modified rules data onto the distributed ledger.

20. The system of claim 19, wherein the modified portion of the decrypted rules data reflects at least one of a generation of an additional rule associated with the completion of the corresponding term, a deletion of at least one of the established rules associated with the corresponding term, or a modification of at least one of the established rules associated with the corresponding term.

21. The system of claim 1, wherein the software instructions, when executed, further configure the processor to:

modify a portion of the decrypted triggering event data to reflect the completion of the corresponding term;

encrypt the modified triggering event data using the a public cryptographic key associated with the corresponding device; and generate one or more additional ledger blocks that record the modified triggering event data onto the distributed ledger.

22. The system of claim 1, wherein the modified portion of the decrypted event data reflects a deletion of the at least one triggering event.

* * * * *